United States Patent [19]
Hashima et al.

[11] Patent Number: 6,115,505
[45] Date of Patent: Sep. 5, 2000

[54] AREA DETECTION APPARATUS

[75] Inventors: Masayoshi Hashima; Fumi Hasegawa; Shinji Kanda; Tsuguto Maruyama, all of Kawasaki, Japan

[73] Assignee: Technology Research Association of Medical and Welfare Apparatus, Tokyo, Japan

[21] Appl. No.: 09/038,113

[22] Filed: Mar. 11, 1998

[30] Foreign Application Priority Data

Sep. 5, 1997 [JP] Japan ..................................... 9-241245

[51] Int. Cl.[7] ...................................................... G06K 9/36
[52] U.S. Cl. ............................ 382/286; 382/215; 382/278
[58] Field of Search ................................... 382/215, 216, 382/218, 278, 282, 286

[56] References Cited

U.S. PATENT DOCUMENTS

| 1,705,030 | 3/1929 | Sacerdote . | |
|---|---|---|---|
| 4,254,453 | 3/1981 | Mouyard et al. | 362/240 |
| 4,419,655 | 12/1983 | May | 340/323 |
| 4,556,985 | 12/1985 | Hongo | 382/218 |
| 4,724,629 | 2/1988 | Walton | 40/451 |
| 4,797,941 | 1/1989 | Lloyd et al. | 382/218 |
| 4,914,731 | 4/1990 | Chen | 340/815.2 |
| 5,390,093 | 2/1995 | Himeno et al. | 362/249 |
| 5,555,163 | 9/1996 | Pisani | 362/252 |
| 5,704,708 | 1/1998 | Barson et al. | 362/238 |
| 5,715,619 | 2/1998 | Polisois et al. | 362/294 |
| 5,848,190 | 12/1998 | Kleehammer et al. | 382/218 |
| 5,890,808 | 4/1999 | Neff et al. | 382/278 |

OTHER PUBLICATIONS

H. Okuda, et al., "Three–level Broad–Edge Matching Based Real Time Tracking Vision", *Collected Papters, 13th Academic Lecture Meeting, Robotics of Society of Japan*, pp. 321–322 (1995).

K. Sumi, et al., "Three–level Broad–Edge Matching Based Real Time Robot Vision", *Proc. International Conference Robotics and Automation*, pp. 1416–1422 (1995).

*Primary Examiner*—Yon J. Couso
*Attorney, Agent, or Firm*—Staas & Halsey LLP

[57] ABSTRACT

There is disclosed an area detection apparatus in which a reference image having a predetermined pattern is prepared beforehand, and an area having the same pattern as the reference image is detected from an inputted search image. A reference image, in which only a pattern is determined, but density values for each area are not determined, is prepared. Respective density mean values for partial areas of the noticed area, each of which correspond to the associated one of partial areas of the reference area, are allocated to the reference area. A correlation operation is performed between the noticed area and the reference image to which the density mean values are allocated. The area detection apparatus is capable of detecting areas with greater accuracy, involving no necessity for an especial hardware or no greatly increasing an amount of operations, even if brightness is varied.

9 Claims, 13 Drawing Sheets

AREA DETECTION APPARATUS

BACKGROUND OF THE INVENTION

1. Field of the Invention

The present invention relates to an area detection apparatus in which a reference image having a predetermined pattern is prepared beforehand, and an area having the same pattern as the reference image is detected from an inputted search image.

2. Description of the Related Art

It is desired to develop robots (including motor vehicles, unmanned motor vehicles and autonomous locomotion robots) for automatically conveying meals, washing and the like in medical and washing facilities such as hospitals or the like. In addition, it is desired to develop motor vehicles also in office buildings, inside rooms of schools, factories, etc., and in roads and the like. For environment measurement apparatuses needed in order that such motor vehicles travel on an autonomous basis, technology of detecting from a camera image a landmark within a traveling environment is important.

As a method of detecting from images a figure having a certain distinctive feature, for example, a landmark or the like, hitherto, there is applied a template matching scheme according to a correlation operation among images. According to such a template matching scheme, a landmark to be detected is set up beforehand in the form of a template image (a reference image), and a correlation operation is performed between an image to be searched and the template image, so that a high correlation area is detected.

An image of a landmark in a traveling environment is not constant in a brightness owing to a variation of a photographic condition, and thus there is a need to perform a proper detection in such a condition that luminance of images is greatly varied. In the correlation operation among images, however, a variation of luminance of images involves a great variation of a correlation value, and thus it is difficult to properly detect the landmark. In order to solve this problem, it is effective to adopt a method of applying a normalized correlation operation. However, the normalized correlation operation involves an increment of an amount of operations. Further, there is proposed a three-level broad-edge matching method (H. Okuda, et al. "Three-level Broad-Edge Matching based Real-time Tracking Vision", Collected Papers, 13th Academic Lecture Meeting, Robotics Society of Japan, pp. 321–322, 1995)(K. Sumi, et al. "Three-level Broad-Edge Matching based Real-time Robot Vision", Proc. International Conference Robotics and Automation, pp. 1416–1422, 1995).

SUMMARY OF THE INVENTION

In view of the foregoing, it is therefore an object of the present invention to provide an area detection apparatus capable of detecting areas with greater accuracy, involving no necessity for an especial hardware or no greatly increasing an amount of operations, even if brightness is varied.

To achieve the above-mentioned object, an area detection apparatus includes a reference image memory to store a reference image having an object area and a background area to be partitioned into a predetermined pattern; an image input unit to input a search image; a search image memory store the search image entered through the image input unit; a data value allocation unit to allocate respective data values to the object area and the background area constituting the reference image; a correlation value operational unit determine a correlation value representative of an extent of an approximation between the reference image in which the respective data values have been allocated by the data value allocation unit and a noticed area including a whole area or a part area of the search image; and an area detection unit to detect from among noticed areas a noticed area which is higher in an extent of an approximation between that noticed area and the reference image in accordance with an operational processing including a comparison between the correlation value determined by the correlation value operational unit and a predetermined threshold, wherein the data value allocation unit allocates first data values, which are mutually same, to respective ones of a plurality of pixels constituting the object area of the reference image, and allocates second data values, which are mutually same, to respective ones of a plurality of pixels constituting the background area of the reference image.

It is noted that there is no need that the correlation value determined in the correlation value operational unit should be a correlation value which is determined through a correlation operation in the mathematical meaning, and any one is acceptable, as the correlation value, which is indicative of the extent of an approximation between the reference image and the noticed area.

It is acceptable that the search image is the same as the reference image in shape, and also acceptable that the search image has an area larger than that of the reference image. In the event that the search image is the same as the reference image in shape, the search image may become the noticed area in its entirety. In the event that the search image has an area larger than that of the reference image, a partial area of the search image may become the noticed area.

According to the area detection apparatus of the present invention, only a pattern of the object area and the background area is determined beforehand in the form of the reference image, and the data value of the object area and the data value of the background area are allocated prior to determination of the correlation value. This feature makes it possible to control the data values in accordance with luminance of the search image or the noticed area of concern, for instance, and thereby maintaining a detection with great accuracy, even if luminance is varied.

In the above-mentioned area detection apparatus, it is preferable that the reference image to be used has the object area and the background area which are equal to one another in area.

The use of the reference image having the object area and the background area which are equal to one another in area makes it possible to detect areas with great accuracy, even if luminance is greatly varied. The reason will be described later.

Further, it is preferable that said data value allocation unit allocates first data values, which are mutually same, to respective ones of a plurality of pixels constituting the object area of the reference image, and allocates second data values, which are mutually same, to respective ones of a plurality of pixels constituting the background area of the reference image.

For example, in the event that a number of frames of images for the same scene are taken in through a camera, a number of frames of images for the same scene would not constant in value of the same pixel in comparison of their images, and would vary including noises due to various types of noise factor. In the event that the image including such noises is selected as an object of search, the use of a reference image in which the object area and the background area have the respective constant data values makes it possible to stably detect an area having pattern close to the reference image for noises of the search image.

Further, in the area detection apparatus according to the present invention, it is preferable that said data value allocation unit allocates mutually different data values to at least one of the object area and the background area constituting the reference image, and thereby producing a plurality of reference images each having a same pattern and a different data value allocated, and that said correlation value operational unit determines respective correlation values between each of the plurality of reference images and the noticed area.

When the respective data values are set up to the object area and the background area constituting the reference image, there is produced a reference image, which is good in detection for a search image involved in a certain luminance (data value), in cooperation with a threshold suitable to those data values. Then, a plurality of reference images having mutually different data values are produced, and an area detection is performed using such plurality of reference images. This feature makes it possible to detect an area with great accuracy for a variation in luminance over wide range.

In the above-mentioned area detection apparatus, it is preferable that said data value allocation unit produces a plurality of reference images each having a same pattern and a different data value allocated in such a manner that areas on which it is decided that a noticed area approximates to a reference image through a comparison between a correlation value and a threshold, in a space wherein data value allocated to the object area constituting the reference image and data value allocated to the background area are given as variables, fill up in their cooperation a predetermined area higher in an extent of an approximation to the reference image in the space, permitting a partial overlapping, and said area detection unit has a threshold set up unit for setting up thresholds each to be compared with an associated one of respective correlation values determined between a plurality of reference images produced in said data value allocation unit and the noticed area.

It is preferable for the detection accuracy that a plurality of reference images having mutually different data values allocated are produced, and an area detection is performed using such plurality of reference images, as mentioned above. However, this involves that an amount of operations is increased in accordance with a number of frames of the reference image, while there is a possibility of inconvenience such that this brings about a failure of detection on some luminance, and useless redundant detection on any of a plurality of reference images. In view of this point, according to the present invention, a plurality of reference images are produced in such a manner that the above-mentioned space is filled up in their cooperation, and a threshold suitable for those reference images is set up. This feature makes it possible to detect an area with great accuracy for a variation in luminance over wide range, suppressing an amount of operation as less as possible.

In the area detection apparatus according to the present invention, it is preferable that said data value allocation unit allocates one value and another value of a maximum value and a minimum value within an available data value limit to the object area and the background area constituting the reference image, respectively.

This feature makes it possible to reduce the reference images to one reference image which is suitable for luminance over a wide range.

Further, in the area detection apparatus according to the present invention, it is preferable that said data value allocation unit has an average arithmetic unit for determining respective mean values of data values for partial areas of the noticed areas, which correspond to the object area and the background area constituting the reference image, respectively, and produces the reference image in which the mean values of data values for partial areas of the noticed areas, which correspond to the object area and the background area constituting the reference image, respectively, determined by said average arithmetic unit are allocated to the object area and the background area, respectively.

This feature makes it possible to cancel the influence of variations of luminance of the search image, and thereby preventing an erroneous detection.

In this case, it is preferable that said average arithmetic unit produces a first reference image in which one value and another value of a maximum value and a minimum value within an available data value limit are allocated to the object area and the background area, respectively and a second reference image in which one value of th maximum value and the minimum value within the available data value limit is allocated to both the object area and the background area, said correlation value operational unit determines respective correlation values between each of the first and second reference images and the noticed area, and said average arithmetic unit determines the respective mean values of data values for partial areas of the noticed areas, which correspond to the object area and the background area constituting the reference image, respectively, in accordance with two correlation values determined in said correlation value operational unit.

Since the area detection apparatus is provided with the correlation value operational unit, performing the above operation using the correlation value operational unit makes it possible to determine at high speed the respective data values to be allocated to the object area and the background area constituting the reference image.

Further, in this case, it is preferable that said area detection unit has a threshold set up unit for setting up a threshold in accordance with a noise level of the noticed area and a length of a boundary line between the object area and the background area constituting the reference image.

This feature makes it possible to detect an area having a desired pattern, even if patterns of the noticed area are varied, or noises are mixed into.

In the area detection apparatus according to the present invention, it is also preferable that in a case where a plurality of detection predictive areas, on which it is predicted that each of the detection predictive areas is detected as an area relatively high in an extent of an approximation to the reference image, are set up, said plurality of detection predictive areas being known in relative positional relation, said area detection unit determines candidate areas relatively high in an extent of an approximation to the reference image through a comparison between a correlation value and a threshold, and extracts an area relatively high in an extent of an approximation to the reference image, from among the candidate areas, in accordance with a relative positional relation between the candidate areas and a relative positional relation between the detection predictive areas.

This feature makes it possible to reduce a possibility of an erroneous detection.

Further, in the area detection apparatus according to the present invention, it is also preferable that the area detection apparatus further comprises an operational sequence control unit for providing such a control that said data value allocation unit produces a first reference image in which respective data values are allocated to the object area and the background area constituting the reference image, said correlation value operational unit determines a correlation value between the first reference image and the noticed area, and said area detection unit detects a noticed area relatively high in an extent of an approximation to the first reference image, and thereafter, again, said data value allocation unit produces a second reference image in which respective data values, which are determined in accordance with the data values of the noticed areas detected once by said area detection unit, are allocated to the object area and the background area, said correlation value operational unit determines a correlation value between the second reference image and the noticed area detected once by said area detection unit, and said area detection unit detects a noticed area relatively high in an extent of an approximation to the second reference image, from among the noticed areas detected once by said area detection unit.

In this manner, repeating the cycles of detection of the area makes it possible to roughly narrow the area to be detected down in the first cycle, and then to perform a great accuracy of detection in the next cycle.

In this case, it is preferable that said data value allocation unit allocates one value and another value of a maximum value and a minimum value within an available data value limit to the object area and the background area, respectively, so that the first reference image is produced. It is also preferable that said data value allocation unit allocates respective mean values of data values for partial areas of the noticed areas detected once by said area detection unit, which correspond to the object area and the background area constituting the reference image, respectively, to the object area and the background area, respectively, so that the second reference image is produced.

In the first cycle, it is possible to perform a rough detection through the use of the reference image consisting of, for example, the maximum value and the minimum value, and in the second cycle, it is possible to perform a great accuracy of detection through the use of the reference image having the data values suitable to the area detected once through the rough detection. It is to be noted that there is no need that the reference image for the rough detection always consists of the maximum value and the minimum value, and it is possible to implement the purpose of the rough detection also through using the above-mentioned plurality of reference images, for instance.

DESCRIPTION OF THE PREFERRED EMBODIMENTS

Hereinafter, there will be described embodiments of the present invention.

Figure 1:
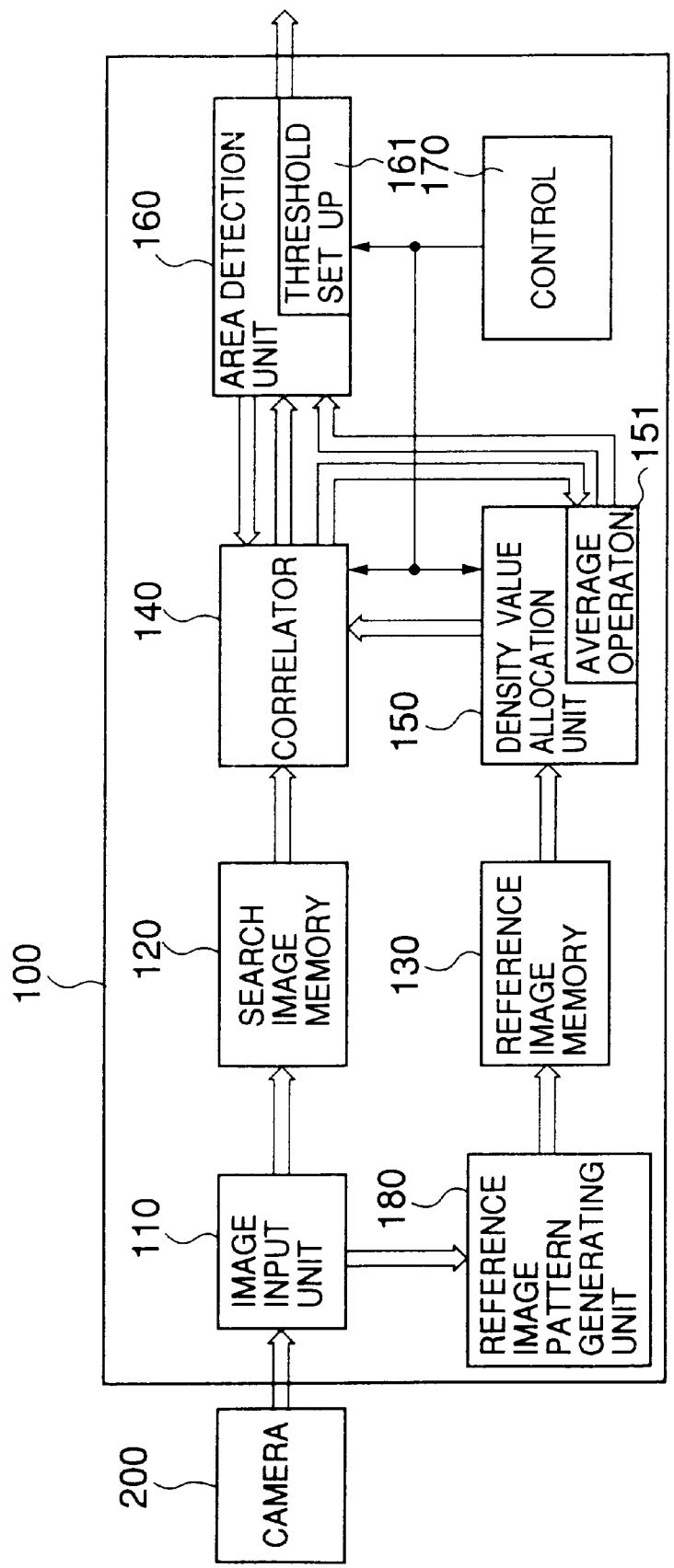
FIG. 1 is a block diagram of an area detection apparatus according to an embodiment of the present invention.

FIG. 1 is a block diagram of an area detection apparatus according to an embodiment of the present invention.

An area detection apparatus 100 shown in FIG. 1 comprises an image input unit 110, a search image memory 120, a reference image memory 130, a correlator 140, a density value allocation unit 150, an area detection unit 160, a control unit 170 and a reference image pattern generating unit 180. Connected to the area detection apparatus 100 is a camera 200 for a video.

The area detection apparatus 100 and the camera 200 are loaded onto a self-support mobile robot, for example. There is set up beforehand a reference image associated with a landmark (hereinafter simply referred to as a "mark") on a traveling path of the self-support mobile robot, and an image (hereinafter referred to as a "search image") is photographed by the camera 200 during a traveling of the self-support mobile robot. The mark is detected from the search image, so that the present position and orientation of the self-support mobile robot itself can be identified, and thereby being used as data for a traveling of the self-support mobile robot.

The image input unit 110 serves as an interface between the camera 200 and the area detection apparatus 100, and receives an image photographed by the camera 200. In the image input unit 110, a signal representative of the image received from the camera 200 is subjected to an A/D conversion to generate digital image data representative of the image. Hereinafter, it happens that an image and image data representative of the image are simply referred to as an image without any distinction therebetween.

When it is intended that a mark is actually detected, an image photographed by the camera 200 is referred to as a search image, and the search image is temporarily stored in the search image memory 120 over the image input unit 110.

On the other hand, the reference image memory 130 stores a reference image produced in association with a mark set up beforehand. When the reference image is produced, a mark is photographed by the camera 200, and an image including the mark is fed via the image input unit 110 to the reference image pattern generating unit 180 in which a reference image associated with the mark is produced. And the reference image is stored in the reference image memory 130. The reference image produced in the reference image pattern generating unit 180 has a predetermined pattern consisting of an object area representative of the mark and a background area forming a background of the mark. While the pattern (a figure of an area partition on the reference image) of the object area and the background area is determined, density values of the object area and the background area are not determined, alternatively, temporarily determined density values are simply allocated. It is noted that a value associated with density or luminance of an image, which is to be allocated or is allocated to a pixel or an area, is referred to as a "density value".

The "density valve" is a typical example of a "data valve" used in the invention.

While the area detection apparatus according to the present embodiment of the present invention has the reference image pattern generating unit 180, there is no need to always provide the reference image pattern generating unit 180. It is acceptable that a camera different from the camera 200 is used to photograph a mark, alternatively, the camera 200 is removed from the area detection apparatus 100 to photograph a mark, so that an image thus obtained is manually Processed, Alternatively, the image is taken into another apparatus to be semi-automatically processed to produce a reference image, and whereby the reference image thus produced is stored in the reference image memory 130 of the area detection apparatus 100.

When the mark is actually detected, the reference image stored in the reference image memory 130 is read out onto the density value allocation unit 150 in which density values are allocated to an object area and a background area, respectively, which constitute the reference image. It will be described later as to what density values are allocated.

The density value allocation unit 150 has an average operation unit 151 for determining density values to be allocated to the reference image. This will be also described later in conjunction with the allocation of the density values.

When the mark is actually detected, an image is photographed by the camera 200, and a search image thus obtained is temporarily stored in the search image memory 120 over the image input unit 110. A noticed area is cut out from the search image stored in the search image memory 120 and then fed to the correlator 140.

The correlator 140 receives also a reference image after allocation of the density values by the density value allocation unit 150. The correlator 140 determines a correlation value d indicative of the extent of an approximation of an inputted reference image to a noticed area. Specifically, when data values of the respective pixels of the reference image and pixel values of the respective pixels of the noticed area are expressed by $A_{ij}$ and $B_{ij}$, respectively, the correlator 140 determines, as a correlation value d, the sum of absolute values of differences between the associated pixel-to-pixel, that is, $$d = \sum_i \sum_j |A_{ij} - B_{ij}| \tag{1}$$

While the operation expressed by the equation (1) is not a correlation operation in a mathematical meaning, it means that the extent of an approximation of the reference image to the noticed area increases with smaller correlation value d. In the present embodiment, the operation expressed by the equation (1) is referred to as the correlation operation. It is noted that when the density value of the reference image is fixed, the correlation value d is greatly varied in accordance with the density value of the noticed area in its entirety, or brightness of the camera subject.

Hereinafter, a cutting out of a noticed area from a search image and a correlation operation in the correlator 140 will be described in conjunction with the accompanying drawings.

Figure 2:
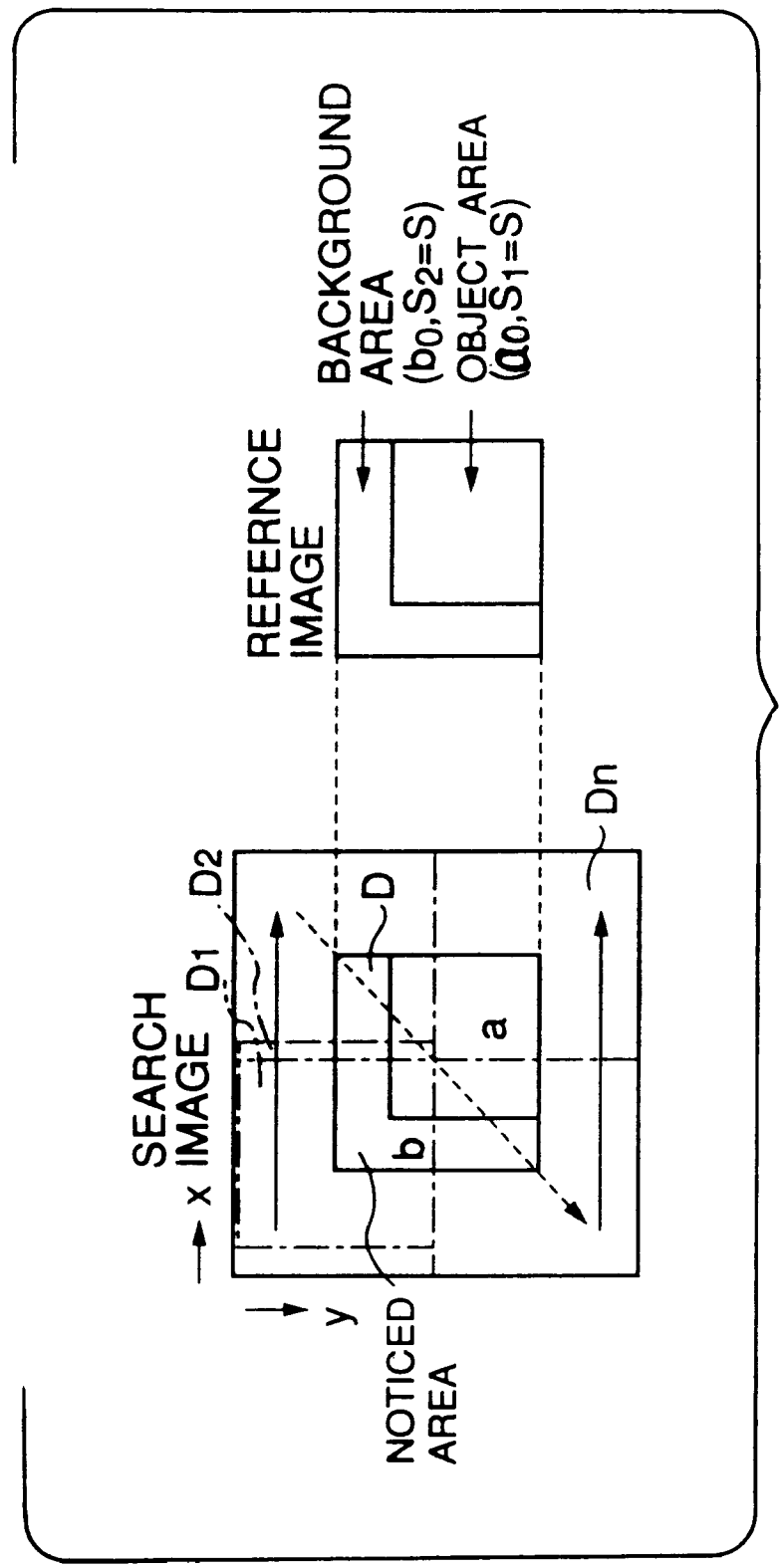
FIG. 2 is an explanatory view useful for understanding a method of cutting out a noticed area from a search image.

FIG. 2 is an explanatory view useful for understanding a method of cutting out a noticed area from a search image.

First, a domain $D_1$ having the same shape as the reference image is read out from the search image memory 120 in such a way that the corner of the upper top and the last left end of the search image is selected as an apex. Here, it is addressed as "cutting out" that a partial domain of the search image is read from the search image memory 120 in such a manner, and the partial domain thus cut out is referred to as a noticed area.

Next, a domain $D_2$ in which the domain $D_1$ of the last corner is shifted by the corresponding one pixel in an x-direction is cut out. At that time, there is no need to read out the domain $D_2$ shifted by the corresponding one pixel in its entirety from the search image memory 120. A memory is used to store the noticed area read once in the correlator 140, and only pixels, which are included in the domain $D_2$ and not included in the domain $D_1$, are read out from the search image memory 120 and then fed to the correlator 140, so that the domain $D_2$ is assembled in the correlator 140. Also in the event that the noticed area is assembled in this manner, it is addressed that the noticed area is cut out. This process is repeated. And when it reaches the last right end of the search image, the process returns to the last left end, so that a domain, which is subject to shifting in a y-direction by the corresponding one pixel, is cut out. Then, domains, which are subject to sequentially shifting in the x-direction by the corresponding one pixel, are cut out in turn. This is repeated, and finally, a domain $D_n$ of the corner of the bottom and the last right end is cut out.

In the correlator 140, a correlation operation is performed in accordance with the equation (1) between the reference image and each of a plurality of noticed areas which are sequentially cut out in such a manner, so that a correlation value d is determined. Here, typically, let us consider a single noticed area D shown in FIG. 2.

As mentioned above, the reference image has an object area and a background area, and it is assumed that density values $a_0$ and $b_0$ are allocated to the object area and the background area, respectively. It is noted that areas of the object area or domain and the background area or domain are denoted by $S_1$ and $S_2$, respectively. Here, it is assumed that $S_1=S_2$, and this is addressed as an area S ($=S_1=S_2$).

Further, it is assumed that averages of density values of pixels of the partial areas of the noticed area D, which partial areas are associated with the object area and the background area of the reference image, respectively, are denoted by a and b, respectively.

Hereinafter, the partial areas of the noticed area, which are in the corresponding positional relation to the object area and the background area of the reference image, are referred to as an "object area of the noticed area" and a "background area of the noticed area", respectively.

Figure 3A:
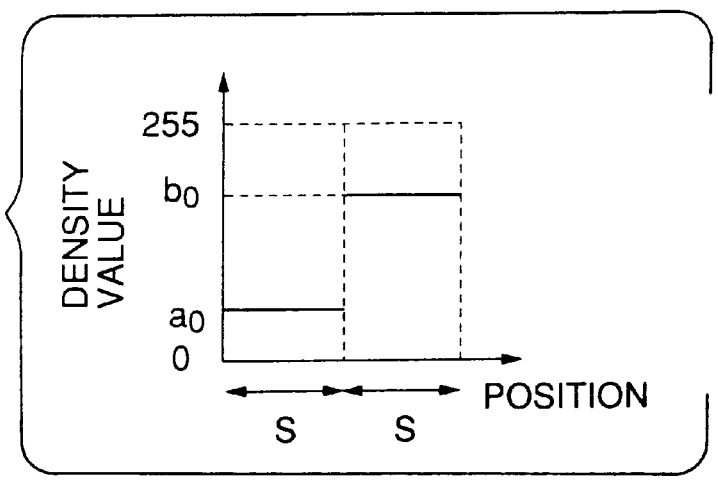
FIGS. 3(A), 3(B) and 3(C) are conceptual explanatory views each useful for understanding a correlation operation of a correlator.
Figure 3B:
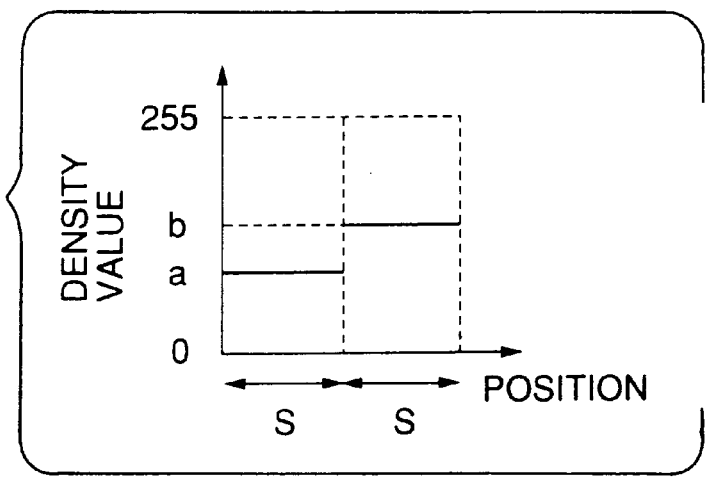
Figure 3C:
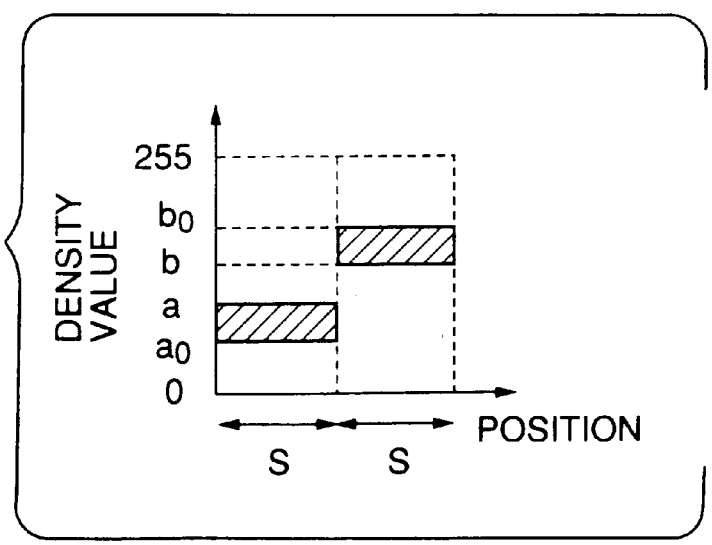

FIGS. 3(A), 3(B) and 3(C) are conceptual explanatory views each useful for understanding a correlation operation of the correlator 140.

FIG. 3(A) is a view in which pixels of the reference image as shown in FIG. 2 are arranged on a one-dimensional basis and the respectively associated density values of the pixels arranged on a one-dimensional basis are shown on the axis of ordinates. Pixels (density value $a_0$) of the object area are arranged on the left half of the axis of abscissas of FIG. 3(A), and pixels (density value $b_0$) of the background area are arranged on the right half of the axis of abscissas of FIG. 3(A). Here, since the pixels are arranged on a one-dimensional basis, areas S of the object area and the background area are replaced by a length of the axis of abscissas. Further, it is noted that the minimum value and the maximum value of the density value are given by 0 and 255, respectively.

FIG. 3(B) is a view, similar to FIG. 3(A), for the noticed area, in which pixels constituting the object area of the noticed area are arranged on the left half of the axis of abscissas of FIG. 3(B), and pixels constituting the background area of the noticed area are arranged on the right half of the axis of abscissas of FIG. 3(B). Here, for the purpose of the simplification, it is assumed that each of the pixels constituting the object area of the noticed area has a density value a, and each of the pixels constituting the background area of the noticed area has a density value b.

FIG. 3(C) is a typical illustration showing a result of a correlation operation in the correlator 140. In this case, a correlation value d is expressed by the sum of an area of a hatched domain sandwiched between the density value $a_0$ and the density value a and an area of a hatched domain sandwiched between the density value $b_0$ and the density value b, which domains are formed when the views of FIG. 3(A) and FIG. 3(B) are superimposed on one another. That is, the correlation value d shown by the equation (1) is expressed as follows.

$$d=|a-a_0|\cdot S+|b-b_0|\cdot S \quad (2)$$

In this manner, the correlation value d is determined in the correlator 140 and then fed to the area detection unit 160. The area detection unit 160 has a threshold value set up unit 161 for setting up a threshold value t to be compared with the correlation value d. The area detection unit 160 determines an inequality between the correlation value d supplied from the correlator 140 and the threshold value t set up by the threshold value set up unit 161. When the correlation value d<the threshold value t, it is determined that the noticed area used to determine the correlation value d is close to the reference image, in other words, the mark is detected. On the other hand, when the correlation value d≧the threshold value t, it is determined that the noticed area used to determine the correlation value d is not close to the reference image. This determination result and position coordinates (position of the mark) of the noticed area close to the reference image are outputted from the area detection apparatus 100. Data outputted from the area detection apparatus 100 is used for a traveling control of an autonomous locomotion robot onto which the area detection apparatus 100 is loaded.

The control unit 170 controls the above-mentioned operations, that is, the allocation of the density values $a_0$ and $b_0$ to the object area and the background area of the reference image by the density value allocation unit 150, and an execution sequence of the detection processing of the mark by the area detection unit 160 by the correlator 140.

The control unit 170 performs a control according to a various types of operation mode set up to the area detection apparatus 100. For instance, the above-mentioned fundamental operation is also a type of operation mode. As another operation mode, for example, for the purpose of increasing a processing speed and also enhancing an accuracy of a mark detection, there is an operation mode in which a series of processing mentioned above is repeated a plurality of number of times. The control unit 170 also performs a sequence control in the event that a series of processing mentioned above is repeated a plurality of number of times. The operation mode in which a series of processing is repeated a plurality of number of times will be described later.

Next, it will be described that it is possible to detect the noticed area approximated to the reference image, or to detect the mark, through practicing a threshold processing to the correlation value d determined according to the equation (1) or the equation (2).

Here, in view of the matter that the explanation will be made including a case where an area of the object domain and an area of the background domain of the reference image are mutually different from each other, the area of the object domain and the area of the background domain are expressed by $S_1$ and $S_2$, respectively. Thus, the correlation value d is expressed, through the equation (2), as follows.

$$d=|a-a_0|\cdot S_1+|b-b_0|\cdot S_2 \quad (3)$$

For the purpose of simplification of the explanation in the extent that the generality is not lost, it is assumed that $a_0<b_0$, $S_1 \leq S_2$.

When the threshold t to be compared with the correlation value d is set up to $$t=(b_0-a_0)\cdot S_1 \quad (4)$$

then regardless an inequality between a and $a_0$, and an inequality between b and $b_0$, the following expression applies.

$$\text{When } d<t, \ a<b \quad (5)$$

In effect, if the correlation value d is less than the threshold t, an inequality of the density values of the object area and the background area of the noticed area becomes always equal to that of the reference image. Even if the density values are varied, or the luminance is varied, an inequality of the density values are not varied. Consequently, the noticed area having an inequality of the density values, which is the same as the reference image, is an area (referred to as a "mark area") on which a mark to be detected is photographed.

The larger correlation value d is permitted with larger threshold t, and thus it is possible to cope with the great variation of the luminance. As show in the equation (4), the threshold t is determined by the density values $a_0$, $b_0$ and the area $S_1$. The density values $a_0$, $b_0$ of the reference image are set up by the density value allocation unit 150 in accordance with situations. As one of the ways of setting up the density values $a_0$, $b_0$ of the reference image, there is a scheme of setting up, as the density values $a_0$, $b_0$ of the reference image, the minimum value (here $a_0$=0) and the maximum value (here $b_0$=0), which are available in the system of the area detection apparatus 100.

The area $S_1$ is determined, when the reference image according to the mark is set up, at the preparatory stage before the area detection apparatus 100 is operated. Here, the explanation is proceeded with under the condition $S_1 \leq S_2$, and thus when $S_1 = S_2$ the threshold t becomes maximum. What is meant by $S_1 = S_2$ implies that the area $S_1$ of the object domain and the area $S_2$ of the background domain of the reference image are equal to one another. At that time, it is possible to most reliably detect the mark for the density variation of the search image. This is the reason why the present embodiment sets up the reference image in which the areas of the object domain and the background domain are the same as each other.

Hereinafter, it will be shown that the equation (5) applies to any cases.

(A) In case of $a \geq a_0$, $b \geq b_0$
  From $d < t$
    $(a-a_0)S_1 + (b-b_0)S_2 < (b_0-a_0)S_1$
    $aS_1 + bS_2 - b_0S_2 - b_0S_1 < 0$
    $a < b_0 + (b_0-b)(S_2/S_1)$
  From $b_0 - b \leq 0$, right-hand member $\leq b_0 \leq b$
  Therefore, $a < b$.

(B) In case of $a \geq a_0$, $b < b_0$
  From $d < t$
    $(a-a_0)S_1 + (b-b_0)S_2 < (b_0-a_0)S_1$
    $aS_1 - bS_2 + b_0S_2 - b_0S_1 < 0$
    $a < b_0\{1-(S_2/S_1)\} + b(S_2/S_1)$
  From $1-(S_2/S_1) \leq 0$, $b < b_0$
  right-hand member $< b \{1-(S_2/S_1)\} + b (S_2/S_1) = b$
  Therefore, $a < b$.

(C) In case of $a < a_0$, $b \geq b_0$
  From $a_0 < b_0$
  Therefore, $a < b$.

(D) In case of $a < a_0$, $b < b_0$
  From $d < t$
    $(a_0-a)S_1 + (b_0-b)S_2 < (b_0-a_0)S_1$
    $(2a_0-a)(S_1/S_2) + b_0\{1-(S_1/S_2)\} < b$
  From $1-(S_1/S_2) > 0$, $b < b_0$
    $b_0\{1-(S_1/S_2)\} > b\{1-(S_1/S_2)\}$
  Therefore,
    $(2a_0-a)(S_1/S_2) + b\{1-(S_1/S_2)\} < b$
    $(2a_0-a)(S_1/S_2) < b(S_1/S_2)$
  From $a < a_0$, left-hand member $> (2a-a)(S_1/S_2)$
  Therefore,
    $a(S_1/S_2) < b(S_1/S_2)$
  Thus, $a < b$ applies.

From the above (A) to (D), it would be understood that the equation (5) applies regardless of an inequality between a and $a_0$, and an inequality between b and $b_0$.

Figure 4:
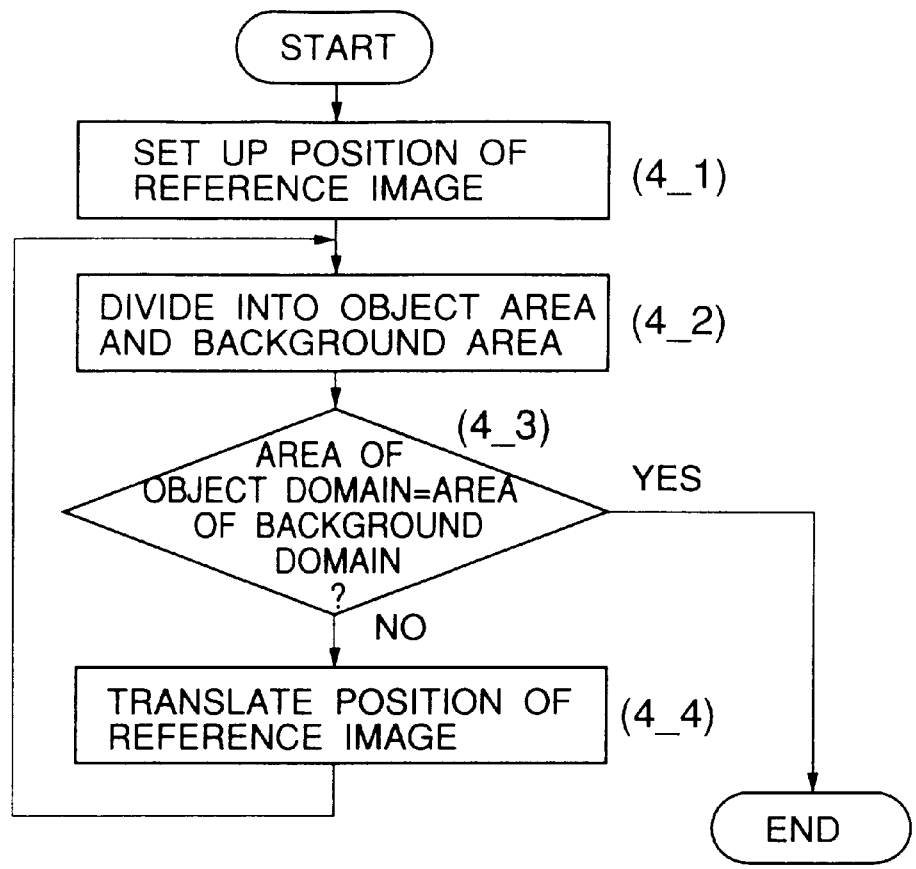
FIG. 4 is a flowchart useful for understanding an example of a method of setting up a reference image in which an object area and a reference area are equal to one another in area.
Figure 5:
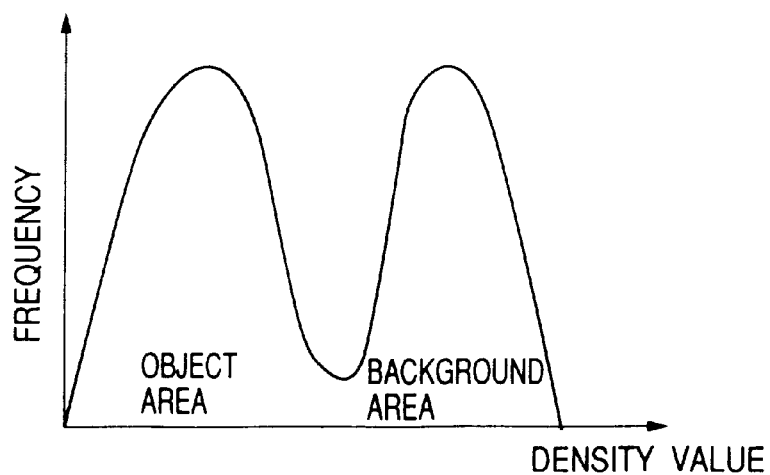
FIG. 5 is a histogram of a reference image to be referred to in the explanation of the flowchart shown in FIG. 4.

FIG. 4 is a flowchart useful for understanding an example of a method of setting up a reference image in which an object area and a reference area are equal to one another in area. FIG. 5 is a histogram of a reference image to be referred to in the explanation of the flowchart shown in FIG. 4.

An area, which is intended to be set up as the mark, is photographed by the camera 200, and an image obtained through the photograph is fed via the image input unit 110 to the reference image pattern generating unit 180. The reference image pattern generating unit 180 generates a reference image pattern based on the image fed thereto in accordance with the flowchart shown in FIG. 4.

First, in step 4_1, an area involving the mark of a reference image from among entered images is set up as the reference image (a candidate therefor). While it is acceptable that the images, which the reference image is set up on the basis of, are a frame of images obtained through photographing by a camera, it is more preferable that averaged images on a plurality of frames are used. The reason why this is to do so is that the use of the averaged images may suppress the noise components included in the images of the respective frames.

In the area partition in which the reference image set up in the step 4_1 is divided into the object area and the background area, a histogram of density values of pixels of the reference image set up in the step 4_1 is determined (cf. FIG. 5), and the recess e of the histogram is regarded as a threshold to partition the reference image into two parts, whereby the reference image is divided into the object area and the background area (step 4_2).

When the reference image is divided into the object area and the background area, then it is determined whether an area of the object area and an area of the background area are equal to each other (step 4_3). When those areas are not equal to each other, the position of the reference image on the image obtained through photographing by the camera is translated (step 4_4), and the process returns to the step 4_2. Hereafter, the similar process is repeated. In the step 4_3, when it is determined that an area of the object area and an area of the background area are equal to each other, this means that the reference image in which an area of the object area and an area of the background area are equal to each other is determined.

When the reference image is determined in this manner, information as to the density value of the object area and the density value of the background area is removed, and information of a pattern consisting of the object area and the background area is extracted and stored in the reference image memory 130.

According to the above explanation of the present embodiment, the density values $a_0$ and $b_0$ are allocated to the object area and the background area of the reference image, respectively. Specifically, the same density values $a_0$ are allocated to any one of the pixels constituting the object area of the reference image, and the same density values $b_0$ are allocated to any one of the pixels constituting the background area of the reference image. The reason why this is to do so is as follows.

The density value of the noticed area of the search image is not constant. Consequently, no constant density value of the reference image causes the correlation value to varies for each frame to the noticed area of the same scene, and thereby bringing about errors in the correlation value. This is caused by the fact that the adopted correlation operation performs an operation of the difference on mutually associated pixels between the reference image and the noticed area, and thus according to this correlation operation, noises on each pixel are accumulated. Then, making the density values of both the object area and the background area of the reference image to be respectively constant makes it possible to reduce influence of the noises. At that time, allocation of the density average value of the whole pixels of the noticed area to the whole pixels of the noticed area brings about the same value in the correlation value therebetween, and then noises of the search pixels are smoothed. Thus it is possible to obtain the correlation value which is stable and less in errors.

The area detection apparatus 100 shown in FIG. 1 is provided with an operational mode in which the density value allocation unit 150 allocates different density values to one or both of the object area and the background area of the reference image, and thereby producing a plurality of reference images each having the same pattern but mutually different in a set $(a_0, b_0)$ of the density value $a_0$ of the object area and the density value $b_0$ of the background area. In this case, the correlator 140 determines for each noticed area cut out from the search image the respective correlation values between the noticed area and each of the plurality of reference images, and the area detection unit 160 determines, in the event that any one of a plurality of correlation values obtained on one of the noticed areas is less than a threshold, that such a noticed area is the mark area.

In case of a single reference image having only a set of density values ($a_0$, $b_0$), generally, the limit of the density value (or the limit of luminance) of the noticed area detected in the form of the mark area is restricted. Then, setting up a plurality of reference images each having the same pattern but mutually different in a set ($a_0$, $b_0$) of the density values makes it possible that the respective reference images mutually compensate the limits of different density values, and thereby coping with a great variation of the density values of the noticed area, or a great variation of luminance.

Figure 6:
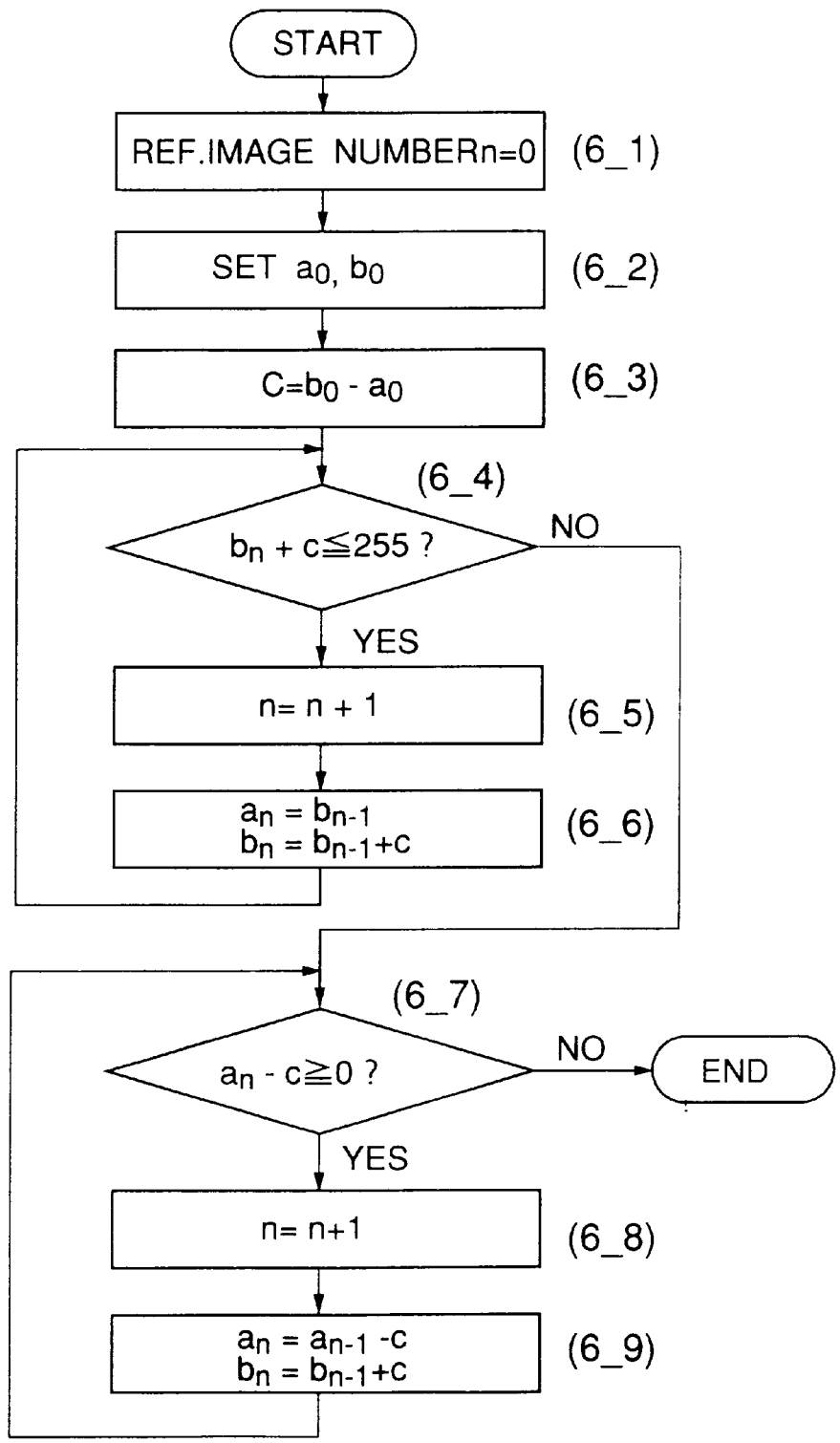
FIG. 6 is a flowchart useful for understanding an example of a method of producing a plurality of reference images in a density value allocation unit.

FIG. 6 is a flowchart useful for understanding an example of a method of producing a plurality of reference images in the density value allocation unit 150.

First, in a step 6_1, a number n to distinguish reference images is set to n=0. Next, in a step 6_2, the density value $a_0$ of the object area and the density value $b_0$ of the background area of the reference image involved in the number n=0 are set up. Next, in a step 6_3, a difference c between the density values $a_0$ and $b_0$, that is, $c=b_0-a_0$ is determined, and then the process goes to a step 6_4 in which it is determined as to whether $b_n+c$ (here $b_0+c$) is not more than 255 which is the upper limit for the apparatus. When $b_n+c \leq 255$, the process goes to a step 6_5 in which the number n is incremented. In a step 6_6, a set ($a_n$, $b_n$) of density values of the reference image involved in the number n (here number 1) is set up to $a_n=b_{n-1}$, $b_n=b_{n-1}+c$, and the process returns to the step 6_4. In the step 6_4, when it is determined that $b_n+c>255$, the process goes to a step 6_7 in which it is determined as to whether $a_n-c \geq 0$. When $a_n-c \geq 0$, the process goes to a step 6_8 in which the number n is incremented. In a step 6_9, a set ($a_n$, $b_n$) of density values of the reference image involved in the number n is set up to $a_n=a_{n-1}-c$, $b_n=a_{n-1}$, and the process returns to the step 6_7. In the step 6_7, when it is determined that $a_n-c<0$, the program exits the routine.

The density value allocation unit 150 produces a plurality of reference images each having the same threshold $t=(b_0-a_0)$. S in accordance with the procedure shown in FIG. 6.

Figure 7:
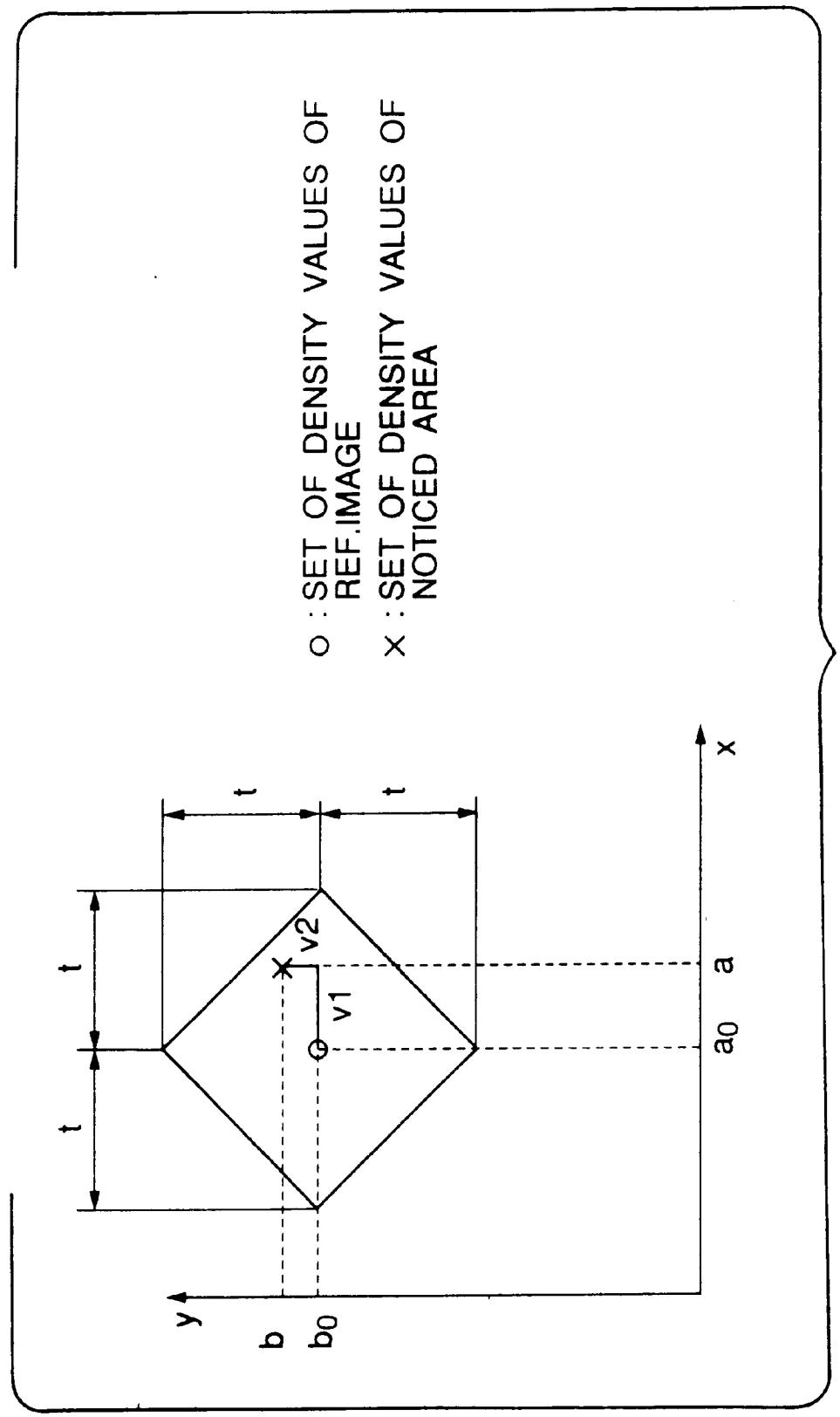
FIG. 7 is an explanatory view useful for understanding an alternative example of a method of producing a plurality of reference images.

FIG. 7 is an explanatory view useful for understanding an alternative example of a method of producing a plurality of reference images. The density value allocation unit 150 is programmed so as to produce a plurality of reference images each having a set of density values set up beforehand on the basis of the following scheme instead of the method explained referring to FIG. 6, alternatively in conjunction with that method.

Assuming that the density value of the object area and the density value of the background area are denoted by x and y, respectively, let's us consider an x-y space. Then, a combination of these density values may be expressed by (x, y). It is to be noted that a set of the density values of the object area and the background area of the reference image is expressed by ($a_0$, $b_0$) where $a_0<b_0$, and a set of the density values of the noticed area is expressed by (a, b). Providing that the area of the object domain and the area of the background domain are equal to each other, the generality is not lost. At that time, from equation (2), the correlation value d is expressed by $$d=|a-a_0|+|b-b_0| \quad (6)$$

Considering the correlation value through the x-y space, the length of the line segment (v1+v2) coupling ($a_0$, $b_0$) with (a, b) shown in FIG. 7 becomes the correlation value d. Providing that the threshold t is expressed, from the equation (4), by $$t=b_0-a_0 \quad (7)$$

then the inside of the frame of the rhombus show in FIG. 7 is the limit of a set (a, b) of density values of the noticed area to be detected as the mark area.

To set up density values of a plurality of reference images, the diagram shown in FIG. 7 is used to determine sets of density values so as to include a whole combination of density values. This feature makes it possible to set up a suitable reference image.

Figure 8A:
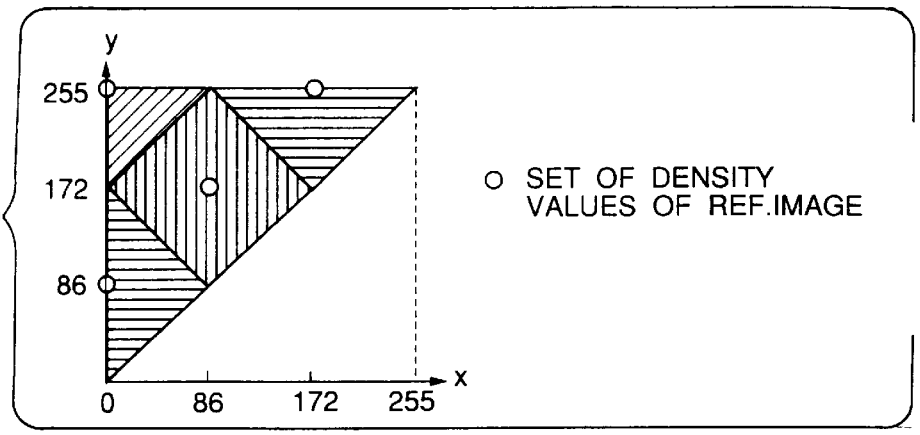
FIGS. 8(A), 8(B) and 8(C) are views each showing sets of density values of the reference images determined on the basis of the scheme explained referring to FIG. 7, and a threshold.
Figure 8B:
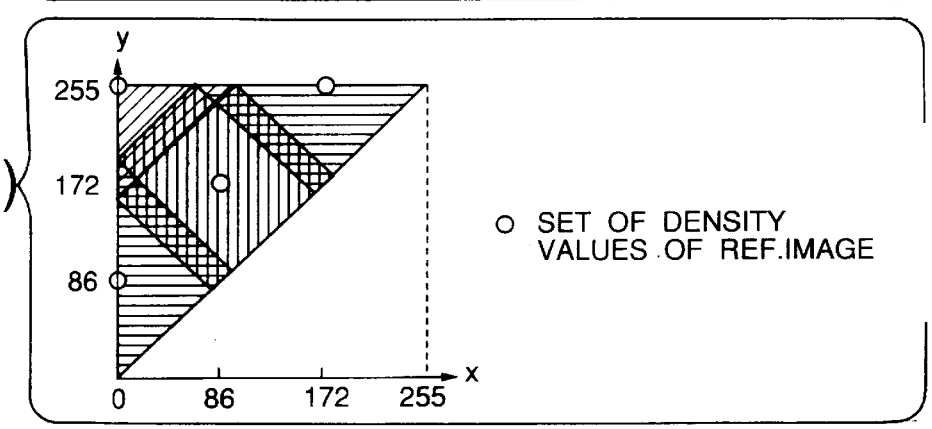
Figure 8C:
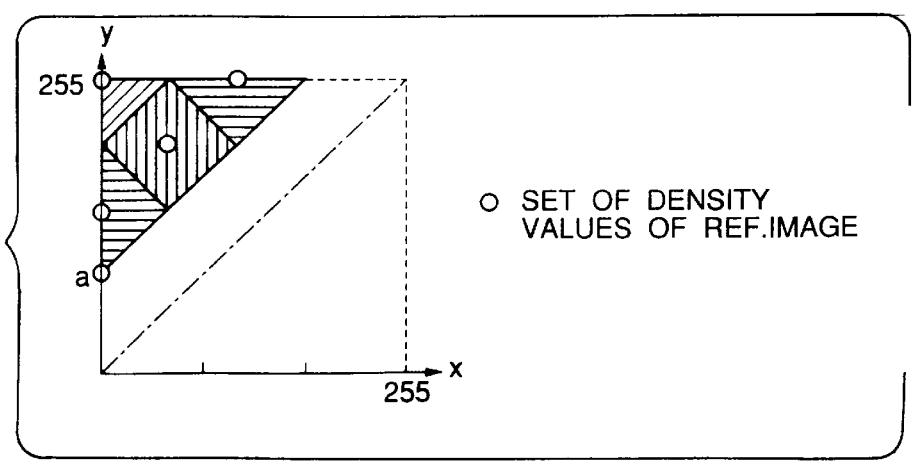

FIGS. 8(A), 8(B) and 8(C) are views each showing sets of density values of the reference images determined on the basis of the scheme explained referring to FIG. 7, and a threshold.

In FIG. 8(A), as sets of density values of the reference image, (0, 86), (86, 86), (172, 255) and (0, 255) are set up. Here, the density value 0 denotes the minimum value available in the apparatus, and the density value 255 denotes the maximum value.

With respect to the threshold t, t=86 is set up on a common basis for four reference images having the above-noted sets of density values. At that time, sets of density values of the noticed area, which can be detected by the four reference images, are depicted by areas shown in FIG. 8(A) with hatching, and fill up the whole of the triangular areas in which a set (a, b) of density values of the noticed area satisfies a<b. Here, since the four reference images are used, as far as a set (a, b) of density values of the noticed area satisfies a<b, the correlation value d, which is determined through the correlation operation with any one of the four reference images, satisfies d<t.

In FIG. 8(B), while it is the same as FIG. 8(A) with respect to sets of density values of the reference images, somewhat large threshold t is set up. Portions of the areas including sets of density values are overlapped.

In order to avoid such an erroneous detection that in spite of the fact that a set (a, b) of density values of the noticed area satisfies a<b, the noticed area is not detected as the mark, it is acceptable that portions of the areas are overlapped as show in FIG. 8(B). When the set (a, b) of density values of the noticed area locates within the overlapped portions, theoretically taking no notice of noises and the like, of four correlation values determined through the correlation operation between the four reference images and the noticed area, two correlation values are not more than the threshold.

FIG. 8(C) shows a view useful for understanding a method of setting up sets of density values of the reference images and the threshold in the event that even if a set (a, b) of density values of the noticed area satisfies a<b, the noticed area is not detected as the mark on the area of b−a<d which implies that the density values a and b are closed to each other. Setting up sets of density values of the reference images and the threshold in the manner as shown in FIG. 8(C) does not detect as the mark area the noticed area on the area of b−a<d, so that the noticed area of b−a$\geq$d is detected by any one of the four reference images.

In the density value allocation unit 150, a plurality of sets of density values based on the above-mentioned concept are programmed, and when the operational mode using a plurality of reference images is designated, the plurality of reference images each having the associated one of the plurality of sets of density values are produced. In the threshold value set up unit 161 of the area detection unit 160, thresholds each corresponding to the associated one of the plurality of reference images are programmed, and when the operational mode using a plurality of reference images is designated, the thresholds each corresponding to the associated one of the plurality of reference images are set up. It is noted that it happens that the same threshold appears on a plurality of reference images.

Figure 9:
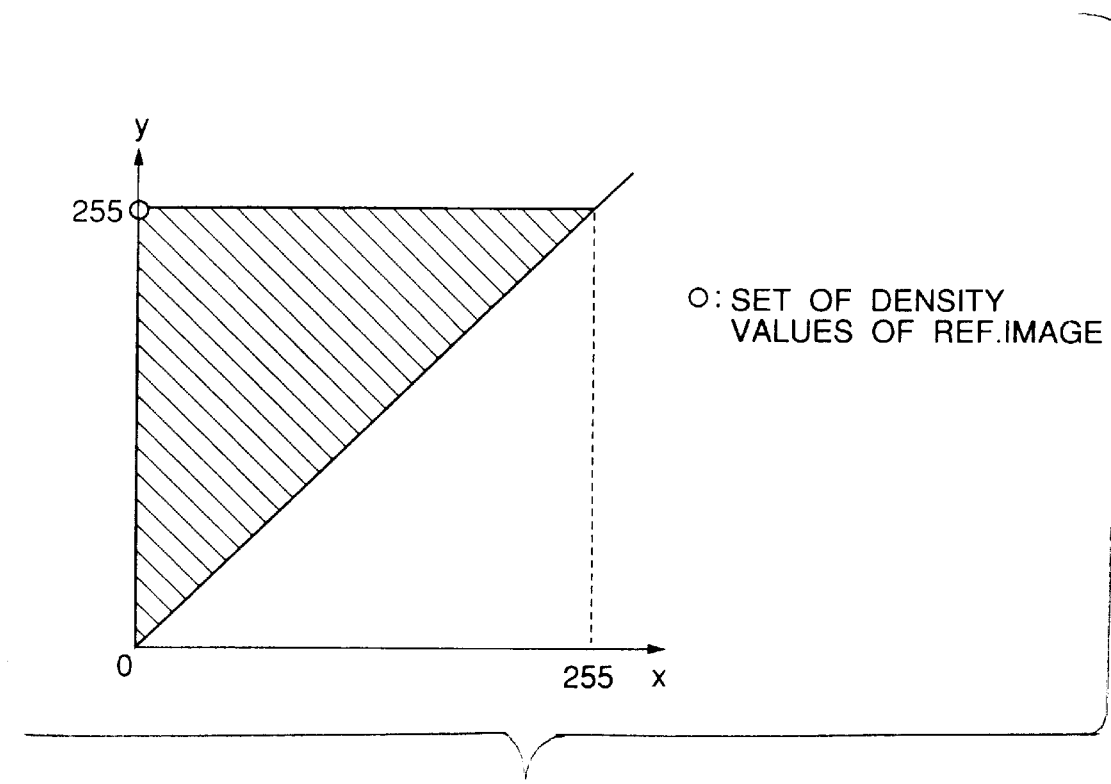
FIG. 9 is a view showing a position and a detection limit of a reference image having a set of density values (0, 255), in a space in which a set of density values is given in the form of a variable.

FIG. 9 is a view showing a position and a detection limit of a reference image having a set of density values (0, 255), in the above-mentioned x-y space.

The threshold t of the equation (4) takes the maximum value when $a_0$=the minimum density value (here 0), $b_0$=the maximum density value (here 255). The threshold t is set up to $t=b_0-a_0$ (it is assumed that the area is normalized to 1). At that time, the detection limit by a set of density values of the reference image and the threshold is shown in FIG. 9 in which the whole limit of x<y is covered, and thus it is possible to cope with any variations in density values (luminance). In other words, producing the reference image of (0, 255) makes it possible to cope with any variations in density values (luminance) with one reference image.

The density value allocation unit 150 shown in FIG. 1 has also a mode in which the reference image having a set of density values (0, 255) is produced as mentioned above.

It is noted that the reference image having a set of density values set up independently of the density values of the noticed area has drawbacks which will be described below. For this reason, the density value allocation unit 150 has also a mode in which an average operation unit 151 determines the respective density averages of the density values of the object area and the density values of the background area of the noticed area, and the respective density averages thus determined are set up as a set of density values of the reference image.

FIGS. 10(A), 10(B), 10(C) and 10(D) are typical illustrations each showing a correlation operation between a reference image having a set of density values ($a_0$, $b_0$) and a noticed area having a complicated pattern.

Figure 10A:
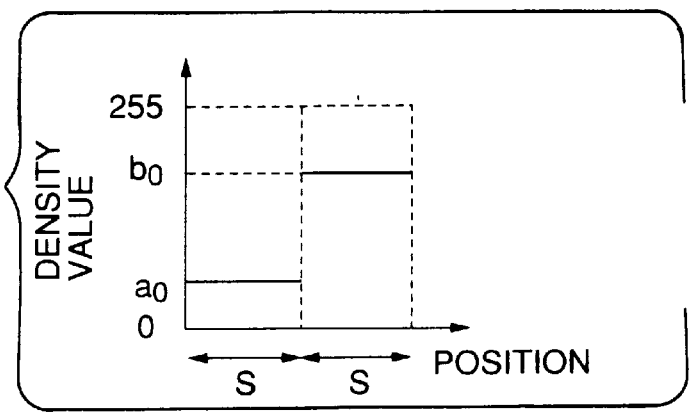
FIGS. 10(A), 10(B), 10(C) and 10(D) are typical illustrations each showing a correlation operation between a reference image having a set of density values ($a_0$, $b_0$) and a noticed area having a complicated pattern.

FIG. 10(A) is an illustration similar to FIG. 3(A), in which pixels of a reference image are arranged on the axis of abscissas on a one-dimensional basis and the respectively associated density values of the pixels arranged on a one-dimensional basis are shown on the axis of ordinates, and the reference image has a set ($a_0$, $b_0$) of density values.

Figure 10B:
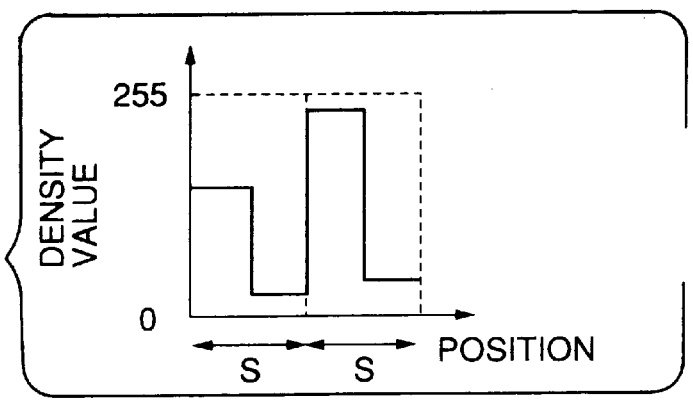

FIG. 10(B) is an illustration similar to FIG. 10(A), but is related to the noticed area, in which the object area and the background area of the noticed area have a complicated density pattern as shown in FIG. 10(B).

Figure 10C:
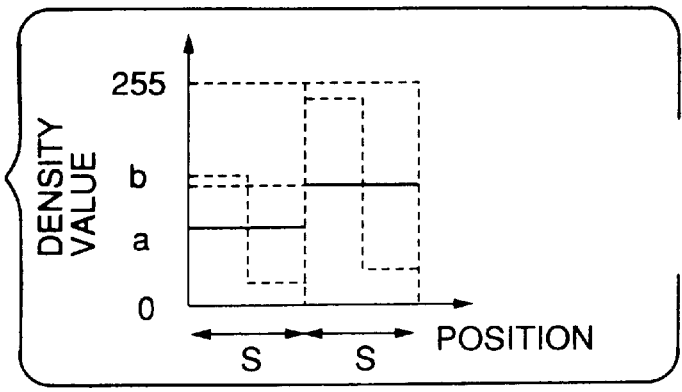

FIG. 10(C) is an illustration showing mean values of density values for the respective object area and background area of the noticed area, in which the mean value of density values for the object area is denoted by a and the mean value of density values for the background area is denoted by b.

Figure 10D:
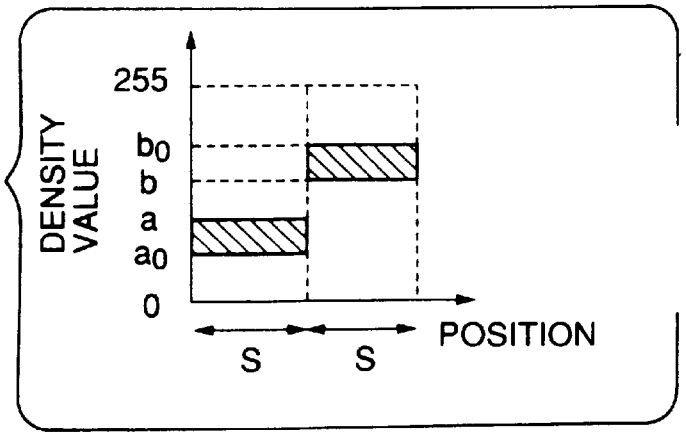

FIG. 10(D) is an illustration showing a result of the correlation operation between the reference image shown in FIG. 10(A) and the noticed area shown in FIG. 10(B). Even in the event that the noticed area has the complicated density pattern as shown in FIG. 10(B), the same correlation value as the noticed area having a set (a, b) of density values as shown in FIG. 10(C) is obtained, and thus there is a possibility that the noticed area, which is apparently different from the reference image, is erroneously detected as the mark area.

On the other hand, when the respective density means values a, b of the object area and the background area of the noticed area are determined, and a reference image in which those density means values a, b are given in the form of a set of density values is produced, the above-mentioned erroneous detection is avoided, and thus it is possible to expect a great accuracy of detection. When the reference image in which those density means values a, b are given in the form of a set of density values is used, the density value allocation unit 150 calculates the absolute value difference between the mean value and the respective object area and background area of the noticed area through the correlation operation between the reference image and the noticed area, so that the sum evaluated as a correlation value. The correlation value thus obtained is representative of dispersion (absolute deviation) of density from the means value.

Therefore, it is possible to evaluate whether the respective density values for the object area and the background area of the noticed area are constant, in accordance with the correlation value thus obtained, and thereby preventing the noticed area as shown in FIG. 10(B) from being erroneously detected as the mark area.

According to the preset embodiment, the average operation unit 151 constituting the density value allocation unit 150 determines the respective density means values for the object area and the background area of the noticed area in accordance with the manner which will be described hereinafter. That is, first, two reference images, which have (0, 255) and (0, 0) in a set ($a_0$, $b_0$) of density values, respectively, are produced. It is acceptable that a reference image of (255, 255) instead of (0, 0) is used. The correlator 140 performs the correlation operation between each of the two reference images and the noticed area. The correlation value of the noticed area having a set (a, b) of density mean values is expressed, with respect to the reference image having a set (0, 255) of density values, by;

$$d_1=|a-0|\times S_1+|b-255|\times S_2=a\times S_1+(255-b)\times S_2 \qquad (8)$$

with respect to the reference image having a set (0, 0) of density values, by;

$$d_2=|a-0|\times S_1+|b-0 S_2=a\times S_1+b\times S_2 \qquad (9)$$

with respect to the reference image having a set (255, 255) of density values, by;

$$d_3=|a-255|\times S_1+|b-255|\times S_2=(255-a)\times S_1+(255-b)\times S_2 \qquad (10)$$

The average operation unit 151 receives those correlation values and determines a set (a, b) of density mean values of the noticed area from two correlation values $d_1$, $d_2$ (or ($d_1$, $d_3$)).

For instance, from the equations (8) and (9), $$(d_1+d_2-255\times S_2)\div(2\times S_1)=a \qquad (11)$$

With respect to b, using a determined by the equation (11) and in addition the equation (9), $$(d_2-a\times S_1)\div S_2=b \qquad (12)$$

From the above, the set (a, b) of density mean values of the noticed area can be derived through a calculation.

Thus, it is possible to determine the respective density mean values for the object area and the background area of the noticed area through the correlation operation.

This is the similar as to the matter of the use of the equation (10). For example, with respect to b, from the equations (8) and (10), $$255\times S_2-(d_1+d_3-255\times S_1)\div(2\times S_1)=b \qquad (13)$$

The density value allocation unit 150 produces a reference image in which the respective density mean values a and b for the object area and the background area of the noticed area, which are determined by the average operation unit 151 in accordance with the above-mentioned way, are established as a set of density values. The reference image thus produced is fed to the correlator 140 for the purpose of the correlation operation between it and the noticed area.

In the event that the reference image in which the respective density mean values for the object area and the background area of the noticed area is used to perform the correlation operation between it and the noticed area, the threshold value set up unit 161 constituting the area detection unit 160 sets up a threshold, which will be explained hereinafter, as a threshold t for evaluating the correlation value determined through the correlation operation, and evaluates the correlation value on the basis of the threshold set up.

Here, it is assumed that 2S ($2S=S_1+S_2$) denotes the whole area of a reference image; e a mean value of noises of images; k length of a boundary line between the object area and the background area of the reference image; f an allowance width in variation of a pattern of the object area and the background area of the noticed area from a pattern of the object area and the background area of the reference area; and a, b the respective density mean values of the object area and the background area of the noticed area. Then the threshold t is set up to $$t = 2 \times S \times e + k \times f \times (b-a) \quad (14)$$

Here, the noise of images implies variation in density value for each pixel of the respective frame of a number of frames obtained through photographing the same scene by the camera 200 (cf. FIG. 1) over a number of frames, and in this case, the mean value of the noises has been determined beforehand and programmed in the threshold value set up unit 161 to set up the threshold t based on the equation (4). With respect to other items also, that is, the area 2S of the reference image, the length k of the boundary line determined in accordance with the pattern of the reference image, and the allowance width f in variation of the pattern of the noticed area, they have been stored beforehand in the threshold value set up unit 161. The threshold value set up unit 161 receives from the average operation unit 151 the respective density mean values a, b for the noticed area thus obtained, and sets up the threshold t based on the equation (4).

Setting up the threshold t based on the equation (4) and using the threshold t to evaluate the correlation value d determined through the correlation operation adopting the reference image in which the respective density means values of the noticed area a, b are established as a set of density values makes it possible to perform a detection of the mark area taking account of noises of images and variations in the pattern of the noticed area.

The area detection apparatus shown in FIG. 1 has an operational mode in which in the event that a plurality of marks wherein a relative positional relation there among is known are set up, the area detection unit 160 detects candidates of the mark area through comparison between the correlation value and the threshold, and extracts the mark area from among the candidates of the mark area in accordance with the relative positional relation among the candidates and the relative positional relation among the marks.

Figure 11:
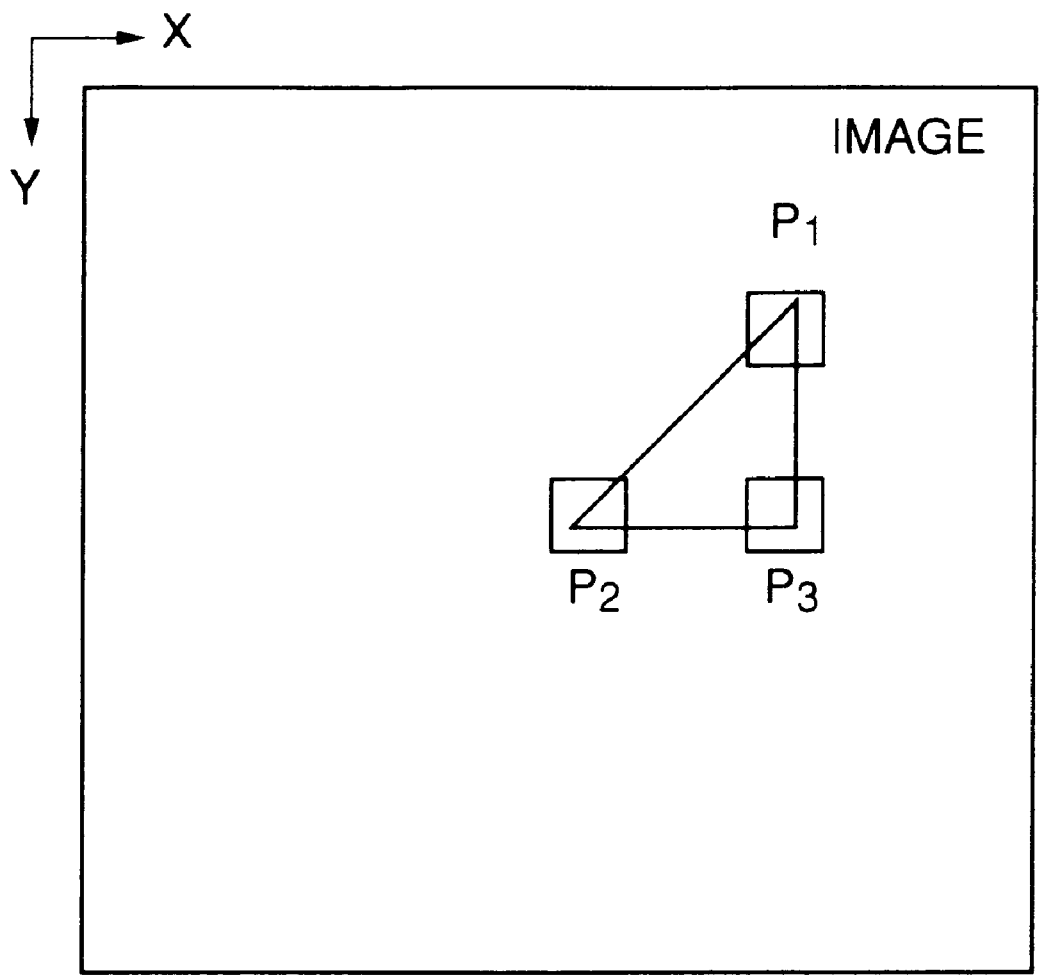
FIG. 11 is a typical illustration showing an image in which a plurality of marks, wherein a relative arrangement position is known, are photographed.

FIG. 11 is a typical illustration showing an image in which a plurality of marks, wherein a relative arrangement position is known there among, are photographed.

Here, as shown in FIG. 11, a plurality of marks are set up to a plurality of positions ($P_1, P_2, \ldots, P_n$, but FIG. 11 illustrates only three positions $P_1, P_2, P_3$). It is acceptable that reference images each corresponding to the associated mark are used to detect a similar area (or areas) from the search image. The detected positions to the mark $P_1$ are expressed $P_1(1), P_1(2), \ldots, P_1(m_1)$. Likewise, the detected positions to the mark $P_n$ are expressed $P_n(1), P_n(2) \ldots, P_n(m_n)$. Provided that the positional relation of the marks $P_1, P_2, \ldots, P_n$ is substantially determined, it is possible to detect the proper mark area through an arrangement relation of the detected positions $P_1(1), \ldots, P_n(m_n)$. An adoption of this scheme makes it possible, when a plurality of 'similar' reference images exist, to separate those 'similar' reference images. Further, since a mark detection result can be verified, it is possible to improve the reliability of the mark detection.

Figure 12:
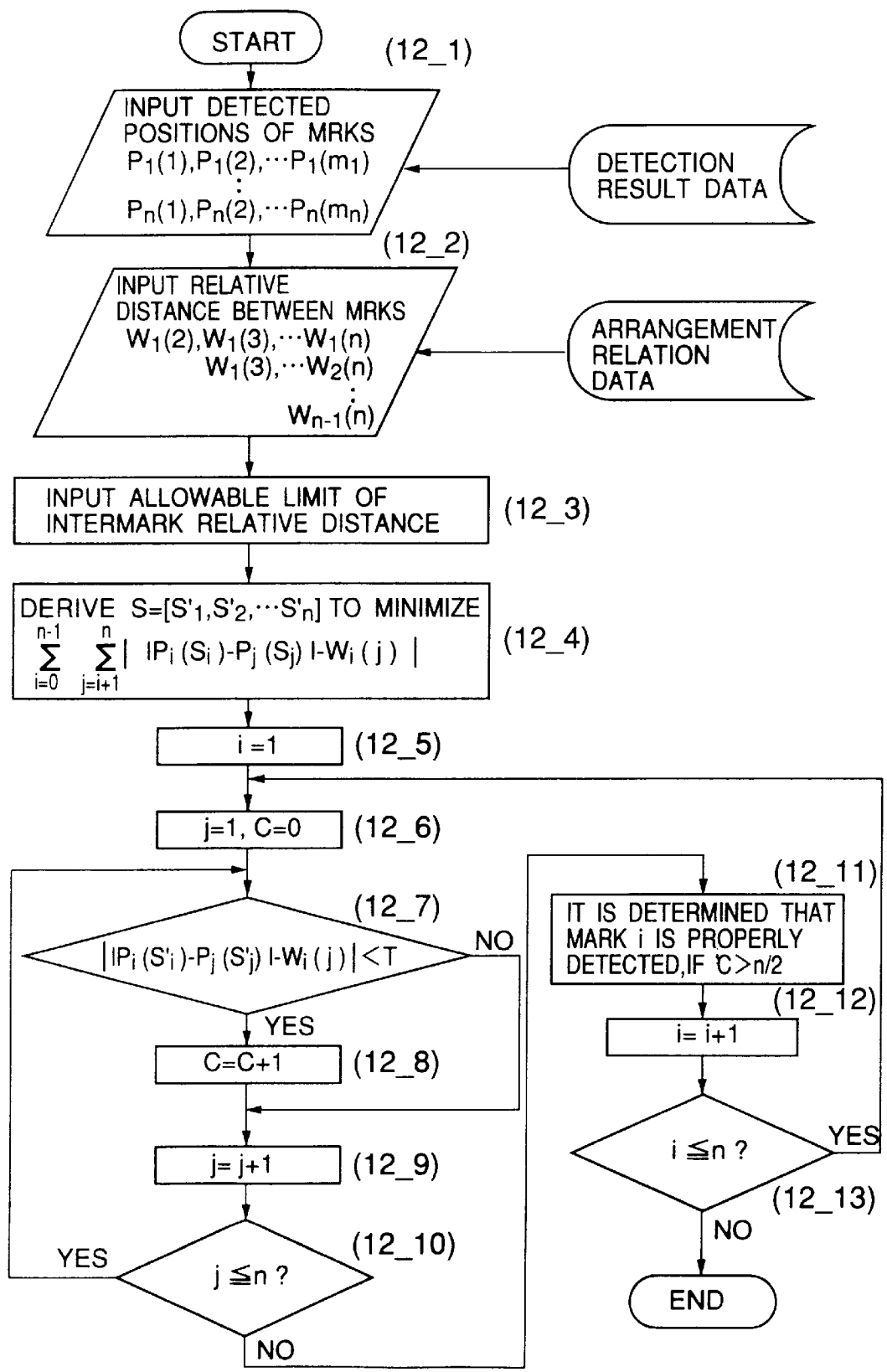
FIG. 12 is a flowchart useful for understanding a mark area detection program in which a proper mark is detected from among candidates of detected mark areas in accordance with an arrangement relation of marks.

FIG. 12 is a flowchart useful for understanding a mark area detection program in which a proper mark is detected from among candidates of detected mark areas in accordance with an arrangement relation of marks.

First, in step 12_1, the mark detected positions $P_1(1), \ldots, P_n(m_n)$ are incorporated into this program. In step 12_2, the known intermark relative distances $W_1(2), W_1(3), \ldots, W_1(n), W_2(3), \ldots, W_2(n), \ldots, W_{n-1}(n)$ are incorporated into this program. The relative distance $W_i(j)$ is indicative of the relative distance the mark i and the mark j. In step 12_3, an allowable limit T of intermark relative distances is incorporated into this program. The allowable limit T is a value on the basis of which it is determined that the relative positional relation of the detected two mark positions $P_i$, $P_j$ is proper when the detected two mark positions $P_i$, $P_j$ satisfy an equation (15) set forth below.

$$L = ||P_i - P_j| - W_i(j)| < T \quad (15)$$

The allowable limit T is determined at the time of the set up of the system including the set up of the mark, and is set up beforehand in the apparatus.

It is noted that each of the variables P and W (suffix omitted) denotes the position vector indicative of a two-dimensional position, and the symbol |...| denotes a norm of the interposed vector ...

In step step 12_4, for all of the combinations of the two marks, detected is a set of mark detection position $$S = [S_1', S_2', \ldots, S_n'] \quad (16)$$

such that the sum of L is minimized in meaning shown in the equation (15).

In effect, when a plurality of candidates is detected for each of the marks, one candidate for each mark is selected in such a manner that the sum of errors in the relative distance of all of the marks, that is, $$\sum_{i=0}^{n-1} \sum_{j=i+1}^{n} ||P_i(S_i) - P_j(S_j)| - W_i(j)|$$

becomes minimum. It is assumed that the candidate for each mark i is $S_i$ as shown in the equation (16). As to how the minimum value of the sum of errors is detected, it is effective to perform a calculation on a round robin basis. In the event that a large number of items exist, the application of the dynamic programming makes it possible to reduce an amount of calculation.

Next, in steps 12_5 to 12_13, the candidates $S_1', S_2', \ldots, S_n'$ of the respective marks, which are detected in step 12_4, are used to investigate whether the relative distance $|P_i(S_i') - P_j(S_j')|$ between the position $P_i$ ($S_i'$) of a certain one (represented by $S_i'$) of those candidates and the respective positions $P_j(S_j')$ of all of the remaining candidates (represented by $S_j'$) is within the allowable limit T for the relative distance $W_t(j)$ between the marks entered in step 12_2, and the number of pieces of the relative distances within the allowable limit is counted, and as a result, when the counted number is more than half of the total of the marks, it is determined that the mark is properly detected on the one candidate $S_i'$. Specifically, first, in step 12_5, 1 is set for i, and in step 12_6, 1 is set for j, and 0 is set for C. And in step 12_7, a determination is made on equation (17).

$$||P_i(S_i)-P_j(S_j)|-W_t(j)|<T \tag{17}$$

In the event that the equation (17) is satisfied, the program proceeds to step 12_8 in which the number C satisfying the equation (17) is counted up. When the equation (17) is not satisfied, the step 12_8 is skipped and the process goes to step 12_9 in which j is incremented. In step 12_10, a determination as to $j \leq n$ is made. As far as $j \leq n$ is satisfied, the steps 12_7 to 12_10 are repeated.

When the program proceeds to step 12_11, with respect to the candidate $S_1'$, the number wherein as to the candidate $S_1'$, the relative distance to another candidate satisfies the equation (17) is stored in C. In the step 12_11, if $C>n/2$, it is decided that the mark i is properly detected. That is, when $C>n/2$, it is decided that the candidate $S_1'$ is a mark area which properly catches the mark i.

In step 12_12, i is incremented and the similar decision is made for the next candidate $S_1'$. This process is repeated, and when the decision is made up to the last candidate $S_1'$ (step 12_13), then the program is terminated.

Figure 13:
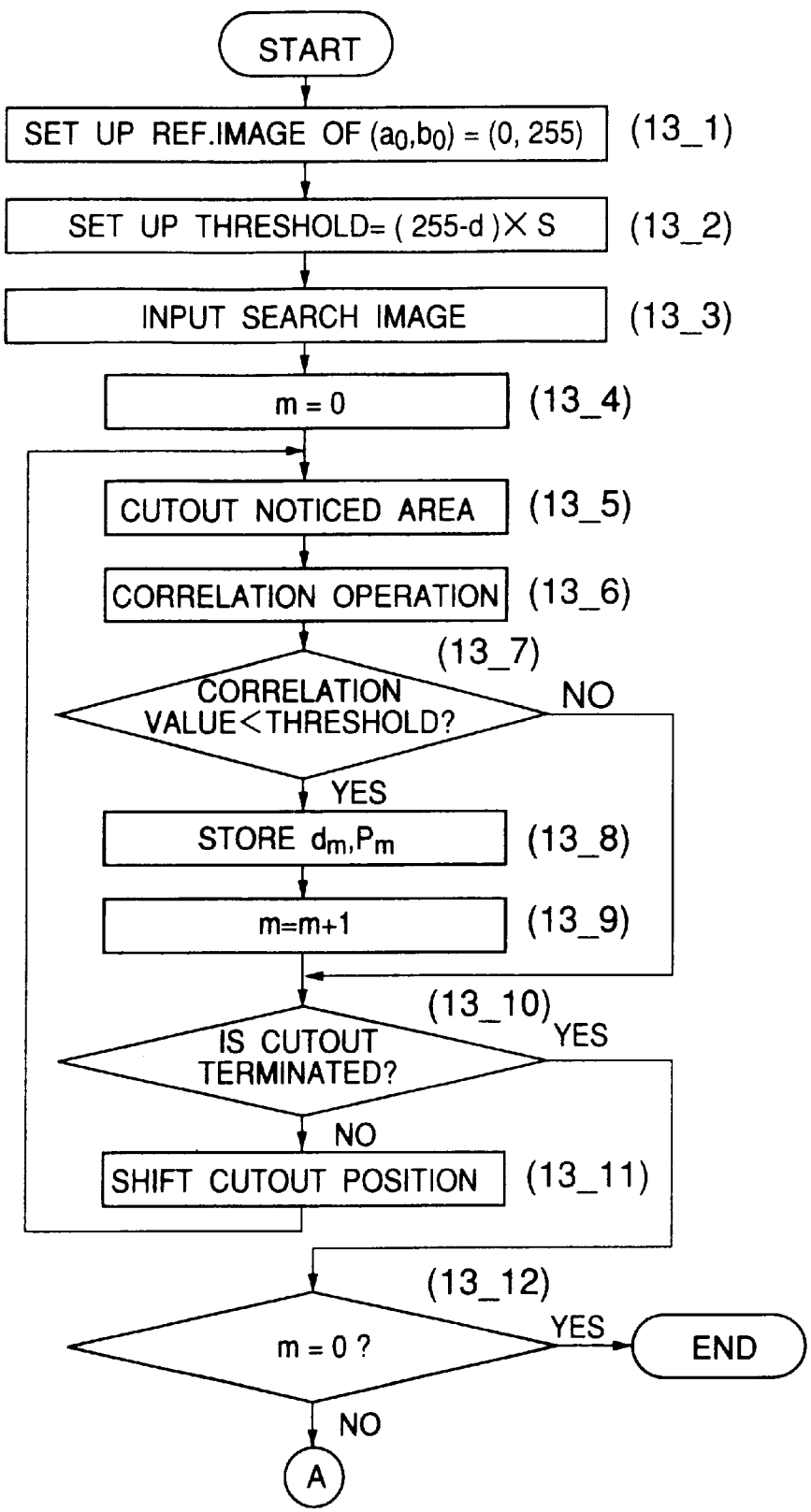
FIG. 13 is a flowchart useful for understanding a processing of an operation mode in which some modes are combined.
Figure 14:
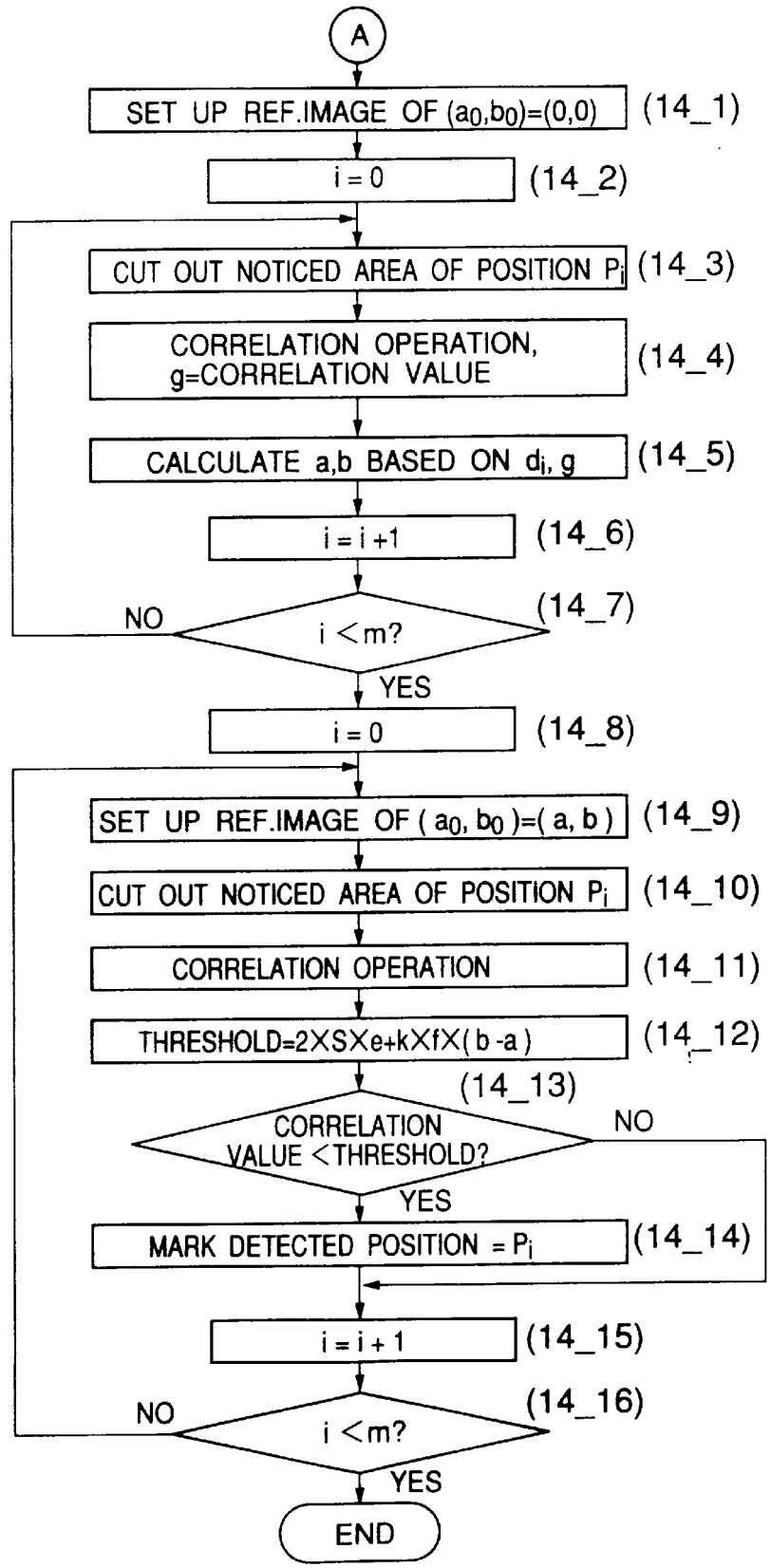
FIG. 14 is a flowchart useful for understanding a processing of an operation mode in which some modes are combined.

FIGS. 13 and 14 are flowcharts, in their combination, useful for understanding a processing of an operation mode in which some modes are combined.

In step 13_1, the density value allocation unit 150 produces a reference image having a set of density values of $(a_0, b_0)=(0, 255)$. In step 13_2, the threshold value set up unit 161 of the area detection unit 160 sets up, as a threshold t, $t=(255-d) \times S$. Where d takes a value which serves not to detect the noticed area in the form of the mark area, in case of $b-a<d$, where the respective mean values of the object area and the background area of the noticed area are denoted by a and b, respectively (cf. the explanation of FIG. 8(C)).

Next, the search image is inputted (step 13_3), and m is set to the initial value 0 (step 13_4). The m is a variable indicative of the number of candidates of the detected mark area. Next, in step 13_5, the noticed area is cut out. In step 13_6, the correlator 140 performs a correlation operation between the noticed area cut out in the step 13_5 and the reference image set up in the step 13_1 so as to determine a correlation value. In step 13_7, the area detection unit 160 performs a comparison between the correlation value determined in the step 13_6 and the threshold set up in the step 13_2. In case of the correlation value<the threshold, the correlation value $d_m$ and the cut out position $P_m$ of the noticed area are stored in the area detection unit 160 (step 13_8). With respect to the noticed area obtained in the step 13_8, as described referring to FIGS. 10(A)–(D), there is a possibility that a noticed area, which is detected through an erroneous detection, is included. Then, the noticed area thus detected is simply a candidate of the mark area. In step 13_9, m is incremented, and in step 13_10, it is decided whether the cut out has been completed. When it is decided that the cut out is not yet completed, the cut out position is translated (step 13_11), and then the noticed area is cut out on the translated cut out position (step 13_5). Hereinafter, the similar process is carried out.

When the cut out is completed (step 13_10), the program proceeds to step 13_12 in which it is decided as to whether m=0 or not, that is, whether at least one of the candidates of the mark areas is detected. When none of the candidates of the mark areas is detected, the program is terminated here. When anyone of the candidates of the mark areas is detected, the process goes to step 14_1 shown in FIG. 14. In steps 14_1 to 14_7, the respective density means values a, b of the object area and the background area of the noticed area detected as the candidate of the mark area are determined. Specifically, in the step 14_1, the density value allocation unit 150 sets up the reference image in which a set of density values $(a_0, b_0)$ is given by (0, 0). In the event that a plurality of candidates of the mark areas exist, the variable i for distinguishing the candidates is set to 0 (step 14_2), and the correlator 140 cuts out again the noticed area of the cut out position $P_i$ (step 14_3) and performs the correlation operation (step 14_4). The correlation value thus obtained is expressed by g.

In step 14_5, the correlation value $d_i$, which is determined using the reference image of a set of density values (0, 255), and the correlation value g, which is determined using the reference image of a set of density values (0, 0), are used to calculate the respective density means values a, b of the object area and the background area of the noticed area of the cut out position i in accordance with the calculation schemes shown in the equations (8) to (12).

This process is repeated on all of the noticed areas detected as the candidates of the mark area (steps 14_6, 14_7).

When the above-mentioned process is terminated, then i is set to the initial value 0 again (step 14_8). In step 14_9, the density value allocation unit 150 sets up the reference image in which a set of density values $(a_0, b_0)$ is expressed by (a, b). In step 14_10, the noticed area of the cut out position $P_i$ detected as the candidates of the mark area is cut out once again. In step 14_11, the correlator 140 performs the correlation operation. In step 14_12, the threshold value set up unit 161 sets up the threshold=$2 \times S \times e + k \times f \times (b-a)$ (with respect to this threshold, refer to the equation (14)). In step 14_13, the correlation value is compared with the threshold. If the correlation value is less than the threshold, it is decided that the candidate of concern is the mark area, and such information that the mark area exists at the cut out position $P_i$ is outputted (step 14_14). This process is repeated on each of the candidates of the mark area (steps 14_15, 14_16).

Performing the correlation operation through determining the respective density mean values a, b of the object area and the background area of the noticed area and setting up the reference image in which the density mean values a, b are established in the form of a set of density values makes it possible to detect the mark area with greater accuracy. However, application of this scheme to a great number of noticed areas needs a necessity of determining the respective density mean values a, b on all of the noticed areas, and thus fails in high speed performance. In view of this point, according to the operational mode shown in FIGS. 13 and 14, first, the reference image of (0, 255) is used to detect the candidates of the mark area permitting a possibility of an erroneous detection, and then a high accuracy of detection algorithm is applied to a relatively small number of candidates (noticed areas) thus detected. Accordingly, it is possible to detect the mark area with greater accuracy, while ensuring a high speed performance.

As mentioned above, according to the present invention, it is possible to detect areas with greater accuracy, involving no necessity for an especial hardware or no greatly increasing an amount of operations, even if brightness is varied.

While the present invention has been described with reference to the particular illustrative embodiments, it is not limited to such embodiments but only by the appended claims. It is to be appreciated that person skilled in the art can change or modify the embodiments without departing from the scope and spirit of the present invention.

What is claimed is:

1. An area detection apparatus, comprising:

a reference image memory to store a reference image having an object area and a background area to be partitioned into a predetermined pattern;

an image input unit to input a search image;

a search image memory to store the search image entered through said image input unit;

a data value allocation unit to allocate respective data values to the object area and the background area constituting the reference image;

a correlation value operational unit to determine a correlation value representative of an extent of an approximation between the reference image in which the respective data values have been allocated by said data value allocation unit and a noticed area including a whole area or a part area of the search image; and an area detection unit to detect from among noticed areas a noticed area which is higher in an extent of an approximation between that noticed area and the reference image in accordance with an operational processing including a comparison between the correlation value determined by said correlation value operational unit and a predetermined threshold, wherein said data value allocation unit allocates mutually different data values to at least one of the object area and the background area constituting the reference image, and thereby produces a plurality of reference images each having a same pattern and a different allocated data value, and wherein said correlation value operational unit determines respective correlation values between each of the plurality of reference images and the noticed area.

2. An area detection apparatus according to claim 1, wherein said data value allocation unit produces a plurality of reference images each having a same pattern and a different data value allocated in such a manner that areas on which it is decided that a noticed area approximates to a reference image through a comparison between a correlation value and a threshold, in a space wherein data value allocated to the object area constituting the reference image and data value allocated to the background area are given as variables, fill up in their cooperation a predetermined area higher in an extent of an approximation to the reference image in the space, permitting a partial overlapping, and said area detection unit has a threshold set up unit to set up thresholds each to be compared with an associated one of respective correlation values determined between a plurality of reference images produced in said data value allocation unit and the noticed area.

3. An area detection apparatus, comprising:

a reference image memory to store a reference image having an object area and a background area to be partitioned into a predetermined pattern;

an image input unit to input a search image;

a search image memory to store the search image entered through said image input unit;

a data value allocation unit to allocate respective data values to the object area and the background area constituting the reference image;

a correlation value operational unit to determine a correlation value representative of an extent of an approximation between the reference image in which the respective data values have been allocated by said data value allocation unit and a noticed area including a whole area or a part area of the search image; and an area detection unit to detect from among noticed areas a noticed area which is higher in an extent of an approximation between that noticed area and the reference image in accordance with an operational processing including a comparison between the correlation value determined by said correlation value operational unit and a predetermined threshold, wherein said data value allocation unit has an average arithmetic unit to determine respective mean values of data values for partial areas of the noticed areas, which correspond to the object area and the background area constituting the reference image, respectively, and produces the reference image in which the mean values of data values for partial areas of the noticed areas, which correspond to the object area and the background area constituting the reference image, respectively, and determined by said average arithmetic unit are allocated to the object area and the background area, respectively.

4. An area detection apparatus according to claim 3, wherein said average arithmetic unit produces a first reference image in which one value and another value of a maximum value and a minimum value within an available data value limit are allocated to the object area and the background area, respectively and a second reference image in which one value of the maximum value and the minimum value within the available data value limit is allocated to both the object area and the background area, said correlation value operational unit determines respective correlation values between each of the first and second reference images and the noticed area, and said average arithmetic unit determines the respective mean values of data values for partial areas of the noticed areas, which correspond to the object area and the background area constituting the reference image, respectively, in accordance with two correlation values determined in said correlation value operational unit.

5. An area detection apparatus according to claim 3, wherein said area detection unit has a threshold set up unit to set up a threshold in accordance with a noise level of the noticed area and a length of a boundary line between the object area and the background area constituting the reference image.

6. An area detection apparatus, comprising:

a reference image memory to store a reference image having an object area and a background area to be partitioned into a predetermined pattern;

an image input unit to input a search image;

a search image memory to store the search image entered through said image input unit;

a data value allocation unit to allocate respective data values to the object area and the background area constituting the reference image;

a correlation value operational unit to determine a correlation value representative of an extent of an approximation between the reference image in which the respective data values have been allocated by said data value allocation unit and a noticed area including a whole area or a part area of the search image; and an area detection unit detect from among noticed areas a noticed area which is higher in an extent of an approximation between that noticed area and the reference image in accordance with an operational processing including a comparison between the correlation value determined by said correlation value operational unit and a predetermined threshold, wherein in a case where a plurality of detection predictive areas, on which it is predicted that each of the detection predictive areas is detected as an area relatively high in an extent of an approximation to the reference image, are set up, said plurality of detection predictive areas being known in relative positional relation, said area detection unit determines candidate areas relatively high in an extent of an approximation to the reference image through a comparison between a correlation value and a threshold, and extracts an area relatively high in an extent of an approximation to the reference image, from among the candidate areas, in accordance with a relative positional relation between the candidate areas and a relative positional relation between the detection predictive areas.

7. An area detection apparatus, comprising:

a reference image memory to store a reference image having an object area and a background area to be partitioned into a predetermined pattern;

an image input unit to input a search image;

a search image memory to store the search image entered through said image input unit;

a data value allocation unit to allocate respective data values to the object area and the background area constituting the reference image;

a correlation value operational unit to determine a correlation value representative of an extent of an approximation between the reference image in which the respective data values have been allocated by said data value allocation unit and a noticed area including a whole area or a part area of the search image; and an area detection unit to detect from among noticed areas a noticed area which is higher in an extent of an approximation between that noticed area and the reference image in accordance with an operational processing including a comparison between the correlation value determined by said correlation value operational unit and a predetermined threshold;

an operational sequence control unit to provide such a control that said data value allocation unit produces a first reference image in which respective data values are allocated to the object area and the background area constituting the reference image, said correlation value operational unit determines a correlation value between the first reference image and the noticed area, and said area detection unit detects a noticed area relatively high in an extent of an approximation to the first reference image, and thereafter, again, said data value allocation unit produces a second reference image in which respective data values, which are determined in accordance with the data values of the noticed areas detected once by said area detection unit, are allocated to the object area and the background area, said correlation value operational unit determines a correlation value between the second reference image and the noticed area detected once by said area detection unit, and said area detection unit detects a noticed area relatively high in an extent of an approximation to the second reference image, from among the noticed areas detected once by said area detection unit.

8. An area detection apparatus according to claim 7, wherein said data value allocation unit allocates one value and another value of a maximum value and a minimum value within an available data value limit to the object area and the background area, respectively, so that the first reference image is produced.

9. An area detection apparatus, comprising:

a reference image memory to store a reference image having an object area and a background area to be partitioned into a predetermined pattern;

an image input unit to input a search image;

a search image memory to store the search image entered through said image input unit;

a data value allocation unit to allocate respective data values to the object area and the background area constituting the reference image;

a correlation value operational unit to determine a correlation value representative of an extent of an approximation between the reference image in which the respective data values have been allocated by said data value allocation unit and a noticed area including a whole area or a part area of the search image; and an area detection unit to detect from among noticed areas a noticed area which is higher in an extent of an approximation between that noticed area and the reference image in accordance with an operational processing including a comparison between the correlation value determined by said correlation value operational unit and a predetermined threshold;

an operational sequence control unit to provide such a control that said data value allocation unit produces a first reference image in which respective data values are allocated to the object area and the background area constituting the reference image, said correlation value operational unit determines a correlation value between the first reference image and the noticed area, and said area detection unit detects a noticed area relatively high in an extent of an approximation to the first reference image, and thereafter, again, said data value allocation unit produces a second reference image in which respective data values, which are determined in accordance with the data values of the noticed areas detected once by said area detection unit, are allocated to the object area and the background area, said correlation value operational unit determines a correlation value between the second reference image and the noticed area detected once by said area detection unit, and said area detection unit detects a noticed area relatively high in an extent of an approximation to the second reference image, from among the noticed areas detected once by said area detection unit, wherein said data value allocation unit allocates respective mean values of data values for partial areas of the noticed areas detected once by said area detection unit, which correspond to the object area and the background area constituting the reference image, respectively, to the object area and the background area, respectively, so that the second reference image is produced.

* * * * *